(12) United States Patent
Ushiyama et al.

(10) Patent No.: US 8,508,068 B2
(45) Date of Patent: Aug. 13, 2013

(54) POWER SUPPLY APPARATUS FOR SLIDING DOOR

(75) Inventors: Masatoshi Ushiyama, Tokyo (JP); Noritsugu Enomoto, Tokyo (JP); Yasuhiko Mukai, Tokyo (JP); Kazuo Miyajima, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 13/399,672

(22) Filed: Feb. 17, 2012

(65) Prior Publication Data
US 2012/0146407 A1 Jun. 14, 2012

Related U.S. Application Data

(60) Division of application No. 12/203,741, filed on Sep. 3, 2008, which is a continuation of application No. PCT/JP2007/064546, filed on Jul. 25, 2007.

(30) Foreign Application Priority Data

| Jul. 31, 2006 | (JP) | 2006-209004 |
| Aug. 14, 2006 | (JP) | 2006-220866 |
| Aug. 14, 2006 | (JP) | 2006-220867 |
| Aug. 14, 2006 | (JP) | 2006-220868 |
| Aug. 14, 2006 | (JP) | 2006-220870 |

(51) Int. Cl.
*H02G 1/06* (2006.01)
*H02G 1/00* (2006.01)

(52) U.S. Cl.
USPC .......................................... 307/9.1; 307/10.1

(58) Field of Classification Search
USPC .................................................. 307/9.1, 10.1
See application file for complete search history.

(56) References Cited

U.S. PATENT DOCUMENTS

| 4,606,146 A | 8/1986 | Jozefozak |
| 5,140,316 A | 8/1992 | DeLand et al. |
| 5,536,061 A * | 7/1996 | Moore et al. ................. 296/155 |
| 5,787,636 A * | 8/1998 | Buchanan, Jr. ................. 49/360 |
| 5,896,704 A | 4/1999 | Neag et al. |
| 5,967,595 A | 10/1999 | Heya et al. |
| 5,992,919 A | 11/1999 | Menke |
| 6,036,257 A | 3/2000 | Manuel |
| 6,036,259 A | 3/2000 | Hertel et al. |
| 6,076,883 A | 6/2000 | Labonde et al. |

(Continued)

FOREIGN PATENT DOCUMENTS

| JP | 5-26664 | 4/1993 |
| JP | 11-78727 | 3/1999 |

(Continued)

*Primary Examiner* — Adi Amrany
(74) *Attorney, Agent, or Firm* — Oblon, Spivak, McClelland, Maier & Neustadt, L.L.P.

(57) ABSTRACT

The power supply apparatus for sliding door 100 includes the vehicle body side fixing member 110 provided in the guide rail receiving portion 143, the bracket side fixing member 120 provided in the bracket 151, the wiring body 130 for supplying power from the vehicle body 140 side to the sliding door 150 side and the running member for bracket 160 for running and holding the wiring body 130 on the back surface of the bracket 151. The wiring body 130 is held with the vehicle body side fixing member 110 and the bracket side fixing member 120, and is arranged to run on the back surface of the bracket 151 with the running member for bracket 160.

5 Claims, 22 Drawing Sheets

(56) References Cited

U.S. PATENT DOCUMENTS

| | | | |
|---|---|---|---|
| 6,079,767 A | 6/2000 | Faubert et al. | |
| 6,108,976 A | 8/2000 | Kato et al. | |
| 6,125,583 A * | 10/2000 | Murray et al. | 49/291 |
| 6,161,894 A | 12/2000 | Chapman | |
| 6,174,020 B1 * | 1/2001 | Knettle et al. | 296/155 |
| 6,321,489 B1 * | 11/2001 | Murofushi et al. | 49/360 |
| 6,358,073 B1 * | 3/2002 | Jhanson et al. | 439/164 |
| 6,386,620 B1 | 5/2002 | Fukumoto et al. | |
| 6,515,229 B2 | 2/2003 | Aoki et al. | |
| 6,517,365 B1 * | 2/2003 | Bungo et al. | 439/162 |
| 6,682,353 B2 * | 1/2004 | Bigotto | 439/34 |
| 6,700,064 B2 | 3/2004 | Aoki et al. | |
| 6,781,058 B1 | 8/2004 | DeCicco et al. | |
| 6,818,827 B2 | 11/2004 | Kato et al. | |
| 6,830,225 B2 | 12/2004 | Kato | |
| 6,881,902 B2 | 4/2005 | Aoki et al. | |
| 6,919,511 B2 | 7/2005 | Tsunoda et al. | |
| 7,042,738 B2 | 5/2006 | Tsubaki | |
| 7,053,306 B2 | 5/2006 | Tsubaki et al. | |
| 7,086,687 B2 | 8/2006 | Aoki et al. | |
| 7,307,216 B2 | 12/2007 | Terada | |
| 7,369,381 B2 | 5/2008 | Tsukamoto et al. | |
| 7,381,898 B2 | 6/2008 | Ide | |
| 7,390,968 B2 | 6/2008 | Kogure et al. | |
| 7,464,500 B2 * | 12/2008 | Choi | 49/360 |
| 7,482,538 B2 | 1/2009 | Kisu et al. | |
| 7,504,579 B2 * | 3/2009 | Frank | 174/36 |
| 7,533,926 B2 * | 5/2009 | Mitsui et al. | 296/155 |
| 7,645,938 B2 | 1/2010 | Kogure et al. | |
| 7,690,718 B2 * | 4/2010 | Blase | 296/155 |
| 7,980,622 B2 * | 7/2011 | Noritsugu et al. | 296/155 |
| 7,992,921 B2 * | 8/2011 | Blase | 296/155 |
| 8,127,497 B2 * | 3/2012 | Rogers et al. | 49/360 |
| 8,182,022 B2 * | 5/2012 | Enomoto et al. | 296/155 |
| 2002/0151213 A1 | 10/2002 | Aoki et al. | |
| 2004/0003543 A1 | 1/2004 | Kobayashi et al. | |
| 2004/0108127 A1 | 6/2004 | Aoki et al. | |
| 2005/0264033 A1 | 12/2005 | Aoki et al. | |
| 2009/0035953 A1 | 2/2009 | Tsubaki | |
| 2009/0044455 A1 | 2/2009 | Enomoto et al. | |
| 2009/0178340 A1 * | 7/2009 | Noritsugu et al. | 49/358 |
| 2010/0193216 A1 | 8/2010 | Ushiyama et al. | |

FOREIGN PATENT DOCUMENTS

| | | |
|---|---|---|
| JP | 11-93514 A | 4/1999 |
| JP | 2000-177508 | 6/2000 |
| JP | 2001-18627 | 1/2001 |
| JP | 2002-79892 A | 3/2002 |
| JP | 2002-225644 A | 8/2002 |
| JP | 2004-34759 A | 2/2004 |
| JP | 2004-114872 a | 4/2004 |
| JP | 2004-190603 | 7/2004 |
| JP | 2005-178700 | 7/2005 |
| JP | 2005-238952 A | 9/2005 |
| JP | 2005-302671 | 10/2005 |
| JP | 2005-310675 | 11/2005 |
| JP | 2006-166642 | 4/2006 |
| JP | 2006-159074 | 6/2006 |
| JP | 2006-166492 | 6/2006 |
| JP | 2006-180699 | 7/2006 |
| JP | 2006-192939 | 7/2006 |

* cited by examiner (a)

(b)

(a)

(b)

(c)

(a)

(b)

(c)

(a)

(b)

(c)

(d)

(a)

(b)

(c)

(a)

(b)

(c)

(a)

(b)

(a)

(b)

(a)

(b)

(a)

(b)

(a)

(b)

POWER SUPPLY APPARATUS FOR SLIDING DOOR

CROSS-REFERENCE TO RELATED APPLICATION

This application is a divisional of U.S. application Ser. No. 12/203,741, filed Sep. 3, 2008, the entire contents of which are incorporated herein by reference. U.S. application Ser. No. 12/203,741 is a continuation of PCT/JP07/064,546, filed Jul. 25, 2007, and claims priority to Japanese Patent Applications 2006-209004, filed Jul. 31, 2006, 2006-220866, filed Aug. 14, 2006, 2006-220867, filed Aug. 14, 2006, 2006-220868, filed Aug. 14, 2006, and 2006-220870, filed Aug. 14, 2006.

TECHNICAL FIELD

This invention relates to the power supply apparatus for sliding door for supplying power all the time from the body side of the automobile to devices within the sliding door.

BACKGROUND ART

Such devices as the power window motors, switches, speakers or the like are incorporated into the sliding door used for a van or a wagon car or the like. In order to supply power from the vehicle body side to the devices, it must be designed that wiring body (wire harness) is arranged to run from the vehicle body side to the sliding door side, while the wire harness smoothly follow the opening and closing of the sliding door. A round wire having high flexibility has been conventionally used as the wire harness.

It is known that there is proposed the power supply apparatus for sliding door in which the wire harness winding unit is provided in the vehicle body side, and the surplus length of the wire harness accompanied with the opening and closing of the sliding door is wound so as to be adjusted (refer to Patent document 1). In order to prevent the wiring body from being sagged, a guide tube is used in the power supply apparatus for sliding door disclosed in the Patent document 1.

It is also known that there is proposed the power supply apparatus for sliding door in which the corrugated tube receiving therein the wiring body is arranged to run with extra-length enough for bending between the prescribed position of the vehicle body and the sliding door, where one end of the corrugated tube is fixed to the sliding door, and the vicinity of the other end is supported in laterally movable by the bracket provided to the vehicle body (refer to Patent document 2).

Furthermore, it is also known that there is proposed the power supply apparatus for sliding door in which the wiring body is arranged to run from the vehicle body 103 side to the sliding door 104 side in use of cable guide 101 in which plural piece members 102 shown in FIG. 42 are joined (refer to Patent document 3). The cable guide 101 is arranged to bend in forming into S-shape when it has loosening.

Patent document 1: Japanese Patent Application Publication Hei 11-93514
Patent document 2: Japanese Patent Application Publication 2002-79892
Patent document 3: Japanese Patent Application Publication 2004-34759

DISCLOSURE OF THE INVENTION

Problem to be Solved

However, the conventional power supply apparatus for sliding door cause a problem that it presents a poor appearance since the wiring body become visible and invisible from passenger and randomly moves in the opening and closing of the sliding door. Furthermore, if the wiring body is randomly exposed when getting in and getting out of the vehicle with the sliding door fully opens, there is a risk to tread on it. And, in the conventional power supply apparatus in which the wiring body is received in the cable guide, there is a risk to tread on and cause damage to the cable guide.

Furthermore, an exterior tube such as guide tube or corrugated tube is used for controlling the movement of the wiring body, however, since the wiring body is arranged to run only after the whole wiring body from vehicle body to sliding door is received in one exterior tube, it cause a problem that time and labor are required for installation of the exterior tube or for running of the wiring body. Furthermore, since both one portion of the wiring body which moves and the other portion which does not move in the opening and closing of the sliding, are received in one unit of the exterior tube, it cause a problem that considerable stress is applied on the wiring body as it moves or protection performance can not be sufficiently obtained.

Therefore, one purpose of the present invention for resolving these problems is to provide a power supply apparatus for sliding door in which the wiring body for supplying power to sliding door is arranged to run such that the wiring body is not exposed outside. Another purpose of the present invention is to provide a power supply apparatus for sliding door in which the wiring body for supplying power to the sliding door is prevented from randomly moving between the vehicle body and the sliding door. Another purpose of the present invention is to provide a power supply apparatus for sliding door in which the exterior tube suitable for the behavior of the wiring body accompanied with the opening and closing of the sliding door is provided.

Means to Solve the Problem

One embodiment of the power supply apparatus for sliding door of the present invention is the power supply apparatus for sliding door for supplying power all the time from a vehicle body to the sliding door in which a bracket is arranged to move along a guide rail received in a guide rail receiving portion of the vehicle body such that the sliding door is capable of opening and closing, including; a wiring body for supplying power from the vehicle body side to the sliding door side; a vehicle body side fixing member provided in a prescribed position of the guide rail receiving portion for holding the wiring body such that the wiring body moves inside the guide rail receiving portion in the opening and closing of the sliding door; a bracket side fixing member provided in a prescribed position of the bracket for holding the wiring body such that the wiring body moves inside the guide rail receiving portion in the opening and closing of the sliding door.

In another embodiment of the power supply apparatus for sliding door of the present invention, a flat cable, as the wiring body, is arranged to run at least between the body side fixing member and the bracket side fixing member, and the flat cable is arranged to run such that moving trace of the flat cable is formed on a horizontal plane with a flat surface of the flat cable perpendicularly maintained.

In another embodiment of the power supply apparatus for sliding door according to the present invention, the vehicle body side fixing member is provided substantially in the middle of the guide rail, and the vehicle body side fixing member is provided more inside the vehicle body than the guide cable.

In another embodiment of the power supply apparatus for sliding door of the present invention, the vehicle body side fixing member has an oblique surface with a prescribed angle in an extracting direction in which the wiring body is extracted from the vehicle body, and the vehicle body side fixing member has a first R portion with prescribed curvature radius in an opposite direction of the extracting direction.

In another embodiment of the power supply apparatus for sliding door of the present invention, the bracket side fixing member has a second R portion and a third R portion, and the wiring body is arranged to run between the second R portion and the third R portion.

Another embodiment of the power supply apparatus for sliding door of the present invention is the power supply apparatus for sliding door for supplying power all the time from the vehicle body to the sliding door which is arranged to open and close with the bracket moved along the guide rail received in the guide rail receiving portion, including; a wiring body for supplying power from the vehicle body side to the sliding door side, the bracket side fixing member provided in a prescribed position of the bracket for holding the wiring body and a running member for the bracket for running and fixing the wiring body on a back surface of the bracket.

In another embodiment of the power supply apparatus for sliding door of the present invention, the running member for bracket includes a running tube into which the wiring body is inserted and a fixing member for fixing the running tube on the back surface of the bracket.

In another embodiment of the power supply apparatus for sliding door of the present invention, the wiring body is the flat cable, and the running member for bracket includes a flat surface adjustment member for adjusting the flat cable extracted from the bracket side fixing member non-parallel to the back surface of the bracket such as parallel to the back surface of the bracket.

In another embodiment of the power supply apparatus for sliding door of the present invention, the running member for bracket further includes a running direction control member for folding the wiring body to control the running direction of the flat cable.

In another embodiment of the power supply apparatus for sliding door of the present invention, the running member for bracket further includes a running base fixed on the back surface of the bracket, in which the flat cable, the flat surface adjustment member and the running direction control member are provided.

Another one embodiment of the power supply apparatus for sliding door of the present invention is the power supply apparatus for sliding door for supplying power all the time from the vehicle body to the sliding door which is arranged to open and close with the bracket moved along the guide rail received in the guide rail receiving portion, including; a wiring body for supplying power from the vehicle body side to the sliding door side; a vehicle body side fixing member provided in a prescribed position of the guide rail receiving portion for holding the wiring body; a bracket side fixing member provided in a prescribed position of the bracket for holding the wiring body; an exterior tube arranged to run at least between the vehicle body side fixing member and the bracket side fixing member, in which the wiring body is received; wherein the exterior tube is arranged to run in such a manner that an upper surface and a lower surface of the exterior tube which substantially have plate-shape, are horizontally maintained, and has a configuration to bend for moving inside the guide rail receiving portion accompanied with the opening and closing of the sliding door.

In another embodiment of the power supply apparatus for sliding door of the present invention, the exterior tube includes the upper surface having high thickness for having high rigidity and the lower surface having low thickness for having low rigidity such that a bent portion is formed in the exterior tube with the upper surface outside and with the lower surface inside.

In another embodiment of the power supply apparatus for sliding door of the present invention, the exterior tube includes the upper surface having high flexibility such that the bent portion is formed with the upper surface outside.

In another embodiment of the power supply apparatus for sliding door of the present invention, grooves are provided on the lower surface of the exterior tube with prescribed gaps in a perpendicular direction to the running direction and the bent portion is formed with the lower surface inside Another embodiment of the power supply apparatus for sliding door of the present invention is the power supply apparatus for sliding door for supplying power all the time from the vehicle body to the sliding door which is arranged to open and close with the bracket moved along the guide rail received in the guide rail receiving portion, including; a wiring body for supplying power from the vehicle body side to the sliding door side; a bracket side fixing member provided in a prescribed position of the bracket for holding the wiring body; a wiring support member for running the wiring body extracted from the bracket side fixing member to the sliding door along the edge portion of the bracket;

In another embodiment of the power supply apparatus for sliding door of the present invention, the wiring support member includes at least not less than two pairs of two fixing hooks having the length more than the width of the wiring body and facing each other, wherein the wiring body is inserted between the two fixing hooks.

In another embodiment of the power supply apparatus for sliding door of the present invention, the wiring support member includes at least not less than two pairs of a mounting hook for mounting the wiring body and a metal fixture facing the mounting hook for fixing the wiring body, wherein the mounting hook is integrally formed with the bracket.

In another embodiment of the power supply apparatus for sliding door of the present invention, the wiring support member includes the running tube into which the wiring body is inserted and a metal fittings for fixing the running tube on the bracket.

Another one embodiment of the power supply apparatus for sliding door of the present invention is the power supply apparatus for sliding door for supplying power all the time from the vehicle body to the sliding door which is arranged to open and close with the bracket moved along the guide rail received in the guide rail receiving portion, including; a wiring body for supplying power from the vehicle body side to the sliding door side; a vehicle body side fixing member provided in a prescribed position of the guide rail receiving portion for holding the wiring body; a bracket side fixing member provided in a prescribed position of the bracket for holding the wiring body; a sliding door side fixing member provided in a prescribed position of the sliding door for holding the wiring body; a exterior tube into which the wiring is inserted for protecting the wiring body; wherein the exterior tube is provided at least from the bracket side fixing member to the sliding door side end of the bracket.

In another embodiment of the power supply apparatus for sliding door of the present invention, a second exterior tube different from the exterior tube provided in the bracket is provided from the vehicle body side fixing member to the bracket side fixing member, wherein the second exterior tube has lower rigidity than the exterior tube.

In another embodiment of the power supply apparatus for sliding door of the present invention, a flat cable, as the wiring body, is arranged to run at least between the vehicle body side and the bracket side fixing member, wherein the flat cable is made of a rectangular conductor covered with prescribed coat.

Effect of the Invention

According to the present invention, it is possible to provide a power supply apparatus for sliding door in which a wiring body for supplying power to sliding door is arranged to run in such a manner that the wiring body is not exposed outside. Since the power supply apparatus for sliding door of the present invention has a configuration in which the wiring body moves inside the guide rail accompanied with the opening and closing of the sliding door, it is possible to prevent the wiring body from being exposed outside and being damaged or from presenting a poor appearance.

In the power supply apparatus for sliding door of the present invention, since the wiring body is arranged to run on the back surface of the bracket, it is possible to prevent the wiring body from being exposed outside accompanied with the opening and closing of the sliding door and to provide the power supply apparatus which achieves a good appearance. Furthermore, since the power supply apparatus for sliding door of the present invention has such a configuration that the exterior tube for receiving the wiring body moves inside the guide rail receiving portion accompanied with the opening and closing of the sliding door, it is possible to prevent the wiring body from being exposed outside and being damaged or from presenting a poor appearance.

According to the present invention, it is possible to provide a power supply apparatus for sliding door for preventing the wiring body from randomly moving between the vehicle body and the sliding door. According to the power supply apparatus of the present invention, since the wiring body is arranged to run along the edge portion of the bracket, it is possible to prevent the wiring body from randomly moving between the vehicle body and the sliding door accompanied with the opening and closing of the sliding door and to provide the power supply apparatus for sliding door which achieves a good appearance.

According to the present invention, it is possible to provide a power supply apparatus for sliding door in which the exterior tube suitable for the behavior of the wiring body accompanied with the opening and closing of the sliding door, is provided. In the power supply apparatus for sliding door of the present invention, since the exterior tube is provided at least in the running position of the bracket where the wiring body is mostly damaged, it is possible to prevent the wiring body from being damaged

Figure 1:
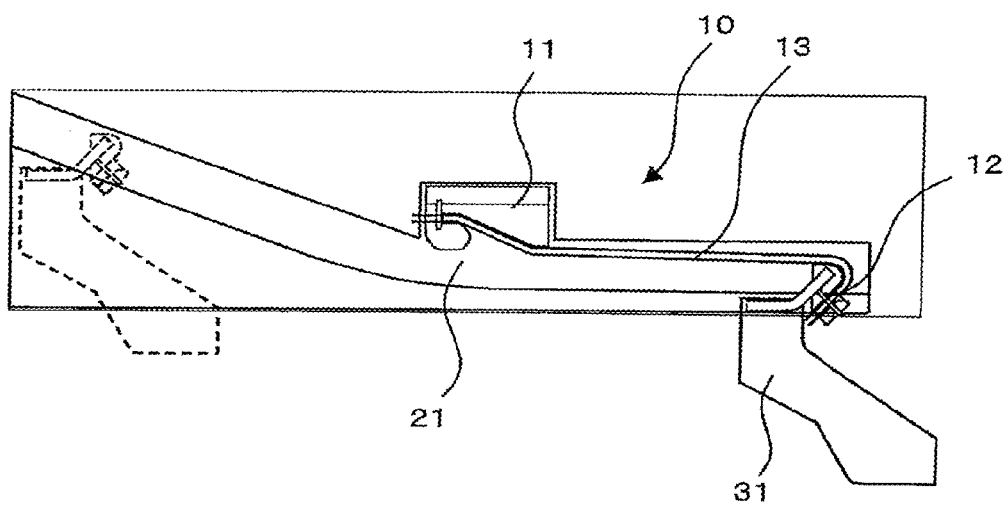
FIG. 1 is plan view of the power supply apparatus for sliding door according to the first embodiment of the present invention.

DESCRIPTION OF REFERENCE NUMERALS 10, 40, 100, 200, 300, 400 . . . power supply apparatus for sliding door
11, 41, 110 . . . vehicle body side fixing member
11a, 41a . . . oblique surface
11b, 41b, 111 . . . first R portion
12, 120 . . . bracket side fixing member
12a, 121 . . . second R portion
12b . . . third R portion
13, 130 . . . wiring body
14 . . . bent portion
20, 140 . . . vehicle body
21, 141 . . . guide rail
22, 142 . . . step
23, 143 . . . guide rail receiving portion
30, 104, 150, 304, 404, 504, 904 . . . sliding door
31, 151 . . . bracket
101, 901 . . . cable guide
102, 302, 402, 502, 902 . . . piece member
103, 303, 403, 503, 903 . . . vehicle body
160, 260 . . . running member for bracket
161 . . . running tube
162 . . . fixing member
230 . . . flat cable
261 . . . flat surface adjustment member
262 . . . running direction control member
263 . . . running base
264 . . . wiring fixing member
267 . . . screw
271 . . . running base
272 . . . protection cover
301 . . . cable guide
131, 231, 331, 431, 531, 631 . . . exterior tube
132, 232, 332, 432, 532, 632 . . . upper surface
133, 233, 333, 433, 533, 633 . . . lower surface
134 . . . side surface
135 . . . hollow portion
136, 236, 336, 436, 536, 636 . . . bent portion
334, 434 . . . groove
534 . . . protruding portion
160, 260, 360 . . . wiring support member
161, 162 . . . fixing hook
163 . . . clamp
261 . . . mounting hook
262 . . . metal fixture
263 . . . hinge
264 . . . bolt
361 . . . running tube
362 . . . metal fittings
363 . . . screw
152 . . . sliding door side fixing member
161, 261, 361, 461 . . . exterior tube
162, 262 . . . metal fixture
501 . . . cable guide

BEST EMBODIMENT FOR CARRYING OUT THE INVENTION

Preferable embodiments of the power supply apparatus for sliding door of the present invention is described in detail with reference to the drawings. For simplicity of the description, each component having the same function uses the same reference numerals.

Figure 2:
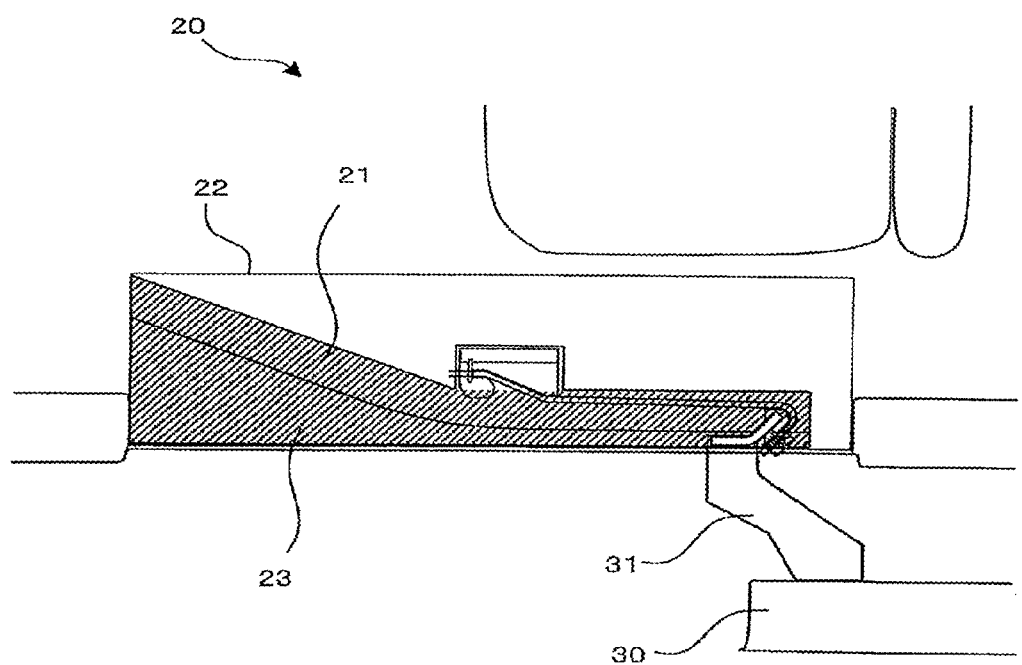
FIG. 2 is plan view of vehicle configuration in the vicinity of the sliding door.

Referring to the FIG. 1, there is illustrated a plan view of the power supply apparatus for sliding door according to the first embodiment of the present invention. The power supply apparatus for sliding door 10 according to the present invention is provided in the vicinity of the guide rail 21 provided in the vehicle body for opening and closing the sliding door. FIG. 2 shows one embodiment of the vehicle configuration in the vicinity of the sliding door. In the FIG. 2, the sliding door 30 is supported with the bracket 31 provided on the lower front portion of the sliding door 30, another bracket provided on the upper front portion of the sliding door 30 and another bracket provided on the rear portion of the sliding door 30, which are not shown in the figures.

On the vehicle body 20 side, the step 22 is provided in a sliding door entry portion and the guide rail 21 is provided underneath the step 22. The guide rail receiving portion 23 (shown in FIG. 2 as shaded) in which the guide rail 21 is provided is space for the bracket 31 to travel. The sliding door 30 is arranged to open and close as rollers provided on the vehicle body side end of the bracket 31, which is not shown in the figures, travels along the guide rail 21.

Furthermore, the guide rail receiving portion is also provided for the bracket which is provided on the upper portion of the sliding door 30, and the power supply apparatus for sliding door according to the present invention is applicable to the upper bracket and guide rail receiving portion. Otherwise, it is applicable to both the upper and lower bracket and guide rail receiving portion.

The guide rail 21 is provided parallel to the vehicle body 20 such that the sliding door 30 moves parallel to the vehicle body 20 from the full-opening status shown in FIG. 2 to the half-closing status. Since when the sliding door 30 moves to the full-closing status, it is necessary to pull the sliding door 30 toward the vehicle body 20 side, the guide rail 21 is arranged to curve toward the inside of the vehicle body 20 in the vicinity of the middle portion to the front portion.

The power supply apparatus for sliding door 10 of the present embodiment includes the vehicle body side fixing member 11 provided in the guide rail receiving portion 23, bracket side fixing member 12 provided in the bracket 31, and the wiring body 13 held with the vehicle body side fixing member 11 and bracket side fixing member 12 for supplying power from the vehicle body 20 side to the sliding door 30 side. In the present embodiment, the power supply apparatus for sliding door 10 is provided inside the guide rail receiving portion 23, and the configurations and fixing positions of the vehicle body side fixing member 11 and bracket side fixing member 12 are defined such that the wiring body 13 does not go beyond the guide rail fixing member 23 in the opening and closing of the sliding door 30.

The vehicle body side fixing member 11 is provided in the vehicle body 20 more inside than the location of the guide rail 21. This is for enabling the wiring body 13 to move more inside, as much as possible, than the location of the guide rail 21, in addition to preventing the vehicle body side fixing member 11 from interfering with the bracket 31 which moves along the guide rail 21.

And the location of the vehicle body side fixing member 11 is substantially in the middle of the guide rail 21 in the direction of the opening and closing of the sliding door 30. Therefore, it is possible to evenly maintain the distance from the vehicle body side fixing member 11 to the bracket side fixing member 12 in the full-closing status and full-opening status of the sliding door 30. And, as a result, it is possible to maintain the length of the wiring body 13 from the vehicle body side fixing member 11 to the bracket side fixing member 12 such that the wiring body 13 has no loosening. The wiring body 13 has such length, it has loosening when the sliding door 30 is in a position between the full-closing position and full-closing position.

Figure 3:
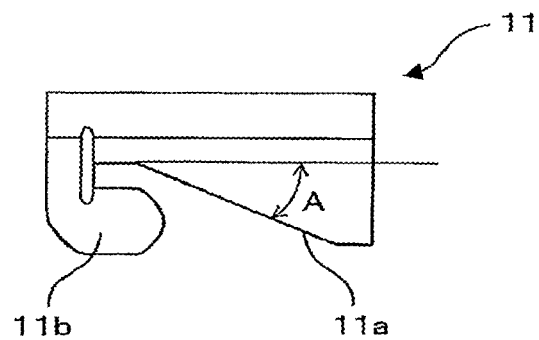
FIG. 3 is plan view of the vehicle body side fixing member.

In the present embodiment of the power supply apparatus for sliding door 10, the vehicle body side fixing member 11 has a configuration shown in FIG. 3 for preventing the wiring body 13 from going beyond the guide rail receiving potion 23 when the wiring body 13 has a loosening. As shown in FIG. 3, the vehicle body side fixing member 11 has the oblique surface 11a and the first R portion 11b such that the wiring body 13 is arranged to run between the oblique surface 11a and the first R portion.

Figure 4:
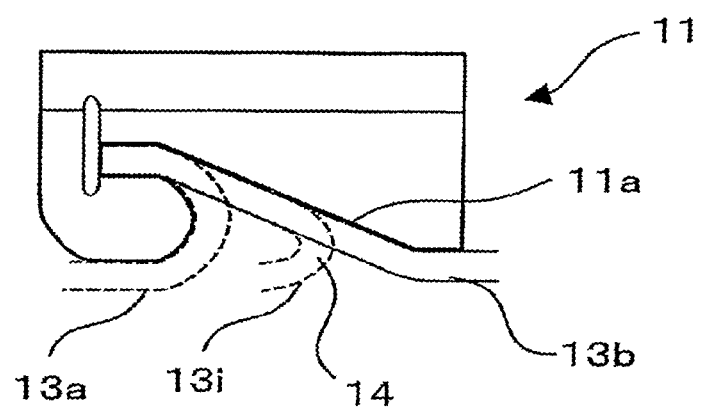
FIG. 4 is plan view of the trace which the wiring body leaves in the body side fixing member.

When the vehicle body side fixing member 11 has such a configuration the wiring body 13 leaves the trace shown in FIG. 4. Namely, when the sliding door 30 fully opens, the wiring body 30 is wound around the first R portion 11b and is stretched to the front as shown by reference numeral 13a.

And, as the sliding door is opened, the wiring body 13 moves along the oblique surface 11a to the rear as shown by the reference numeral 13i in FIG. 4 accompanied with the movement of the bent portion 14 of the wiring body 13 to the rear. When the sliding door 30 fully opens, the wiring body 13 is in contact with the oblique surface 11a and is stretched to the rear.

Therefore, since oblique surface 11a and the first R portion 11b are provided in the vehicle body side fixing member 11, it is possible to move the bent portion 14 of the wiring body 13 substantially parallel to the wall surface of the oblique surface 11a and the guide rail receiving portion 23. The preferable values of the obliquity A of the oblique surface 11a and the curvature radius of the R of the first R potion 11b are obtainable in accordance with the location of the vehicle body side fixing member 11, the length of the wiring body 13, the size of the width and depth of the guide rail receiving portion 23, or the like.

Figure 5:
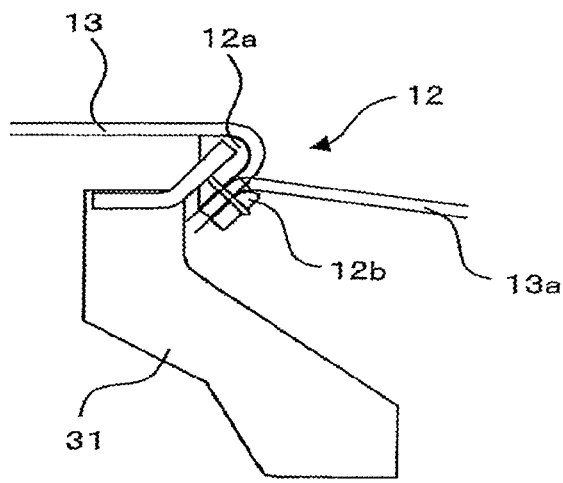
FIG. 5 is plan view of the bracket side fixing member.

On the other hand, the second R portion 12a and the third R portion 12b are provided in the bracket side fixing member 12 which is provided in the bracket 31 as shown in FIG. 5 and the wiring body 13 is arranged to run between the second R part 12a and the third R part 12b. In the present embodiment of the power supply apparatus for sliding door 10, the wiring body 13 is wound around the second R portion 12a when the sliding door 30 fully opens, and the wiring body 13 is wound around the third R portion 12b when the sliding door 30 fully closes.

Figure 6:
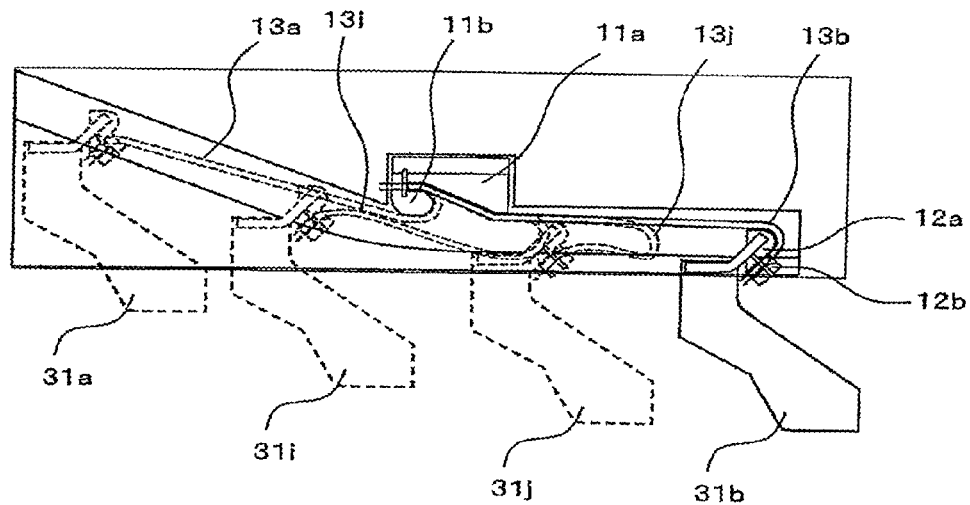
FIG. 6 is plan view of the trace which the wiring body leaves accompanied with the opening and closing of the sliding door.

In the embodiment of the power supply apparatus for sliding door 10 described above, the wiring body 13 moves to leave the trace shown in FIG. 6. Namely, the bracket 31 is located at the forefront shown by reference numeral 31a when the sliding door 30 fully closes, and the wiring body 13 is wound around the first R portion 11b and the third R portion 12b and forms into a linear shape.

As the sliding door 30 moves from the full-closing position to the full-opening position, the bracket 31 moves to the positions of reference numeral 31i and 31j. The wiring body 13 also moves to the reference numeral 13i and 13j accompanied with this movement. In this condition, the wiring body 13 has loosening and the bent portion 14 is formed as the wiring body 13 turns around to bend. The bent portion 14 starts at the first R portion 11b and moves toward the full-opening position of the sliding door as the sliding door moves toward the full-opening position.

Likewise, when the sliding door 30 moves from the full-opening position to the full-closing position, the bent portion starts at the second R part 12a and moves toward the full-closing position. As described above, since the bent portion 14 moves along the wall surface of the oblique surface 11a and guide rail receiving portion 23, it is possible to prevent the wiring body 13 from, for example, forming into a large arc shape and being exposed outside the guide rail receiving portion 23.

When the sliding door 30 is fully opened, the bracket 31 is located in the rear position shown by the reference numeral 31b, and the wiring body 13 is in contact with the oblique surface 11a and is wound around the second R portion 12a to form into a linear shape at the same time. As described above, in the power supply apparatus for sliding door 10 of the present embodiment, it is possible to move the wiring body 13 inside the guide rail receiving portion 23, without a risk that the wiring body 13 is exposed outside the guide rail receiving portion 23, even when the sliding door 30 is located in the full-opening position, in the full-closing position and in the position between the full-opening position and full-closing position.

It is preferable to use the flat cable for the wiring body 13 arranged to run between the vehicle body side fixing member 11 and bracket side fixing member 12. The flat cable is arranged to run in such a manner that a moving trace of the flat cable is formed on a horizontal plane with a flat surface of the flat cable perpendicularly maintained. In the case that a flat cable in which multiple wiring bodies overlapped are used, since the flat cable has restoring force to restore the linear shape when the flat cable is bent in the bent portion 14, it is possible to move the wiring body 13 only inside the guide rail receive member 23 without a risk that the wiring body 13 forms into a large arc shape and is exposed outside.

Either a rectangular conductor or a round wire can be used for a conductor enclosed within the flat cable as the wiring body 13, however, it is more preferable to use the flat cable in which the rectangular conductor is enclosed. And it is preferable that the wiring body 13 is received within a protection tube, at least, in the area between the body side fixing member 11 and the bracket side fixing member 12 in a view point of protection of the wiring body 13, and it is preferable to use the wiring body protection tube which has flexibility, such as corrugate tube.

The wiring body 13 can be extended and used from the bracket side fixing member 12 to the sliding door 30 side, or, for example, another wiring body can be connected with the wiring body 13 in use of a connector. The wiring body extended from the bracket side fixing member 12 to the sliding door 30 side can be flat cable, or, for example, round wire.

Figure 7:
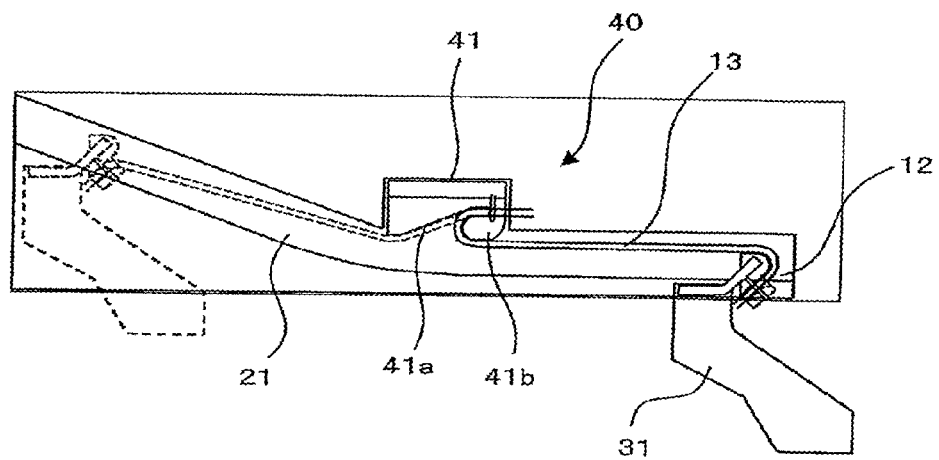
FIG. 7 is plan view of the power supply apparatus for sliding door according to the second embodiment.

The power supply apparatus for sliding door according to the second embodiment of the present invention is explained with reference to FIG. 7. In the power supply apparatus for sliding door 40 shown in FIG. 7, the aspect of body side fixing member 41 is opposite to the one of the embodiment shown in FIG. 1. In this case, the wiring body is in contact with the oblique surface 41a when the sliding door 30 is fully closed, and is wound around the first R part 41b when the sliding door is fully opened. In this embodiment, the wiring body 13 is also able to move inside the guide rail receiving portion 23 without a risk that the wiring body 13 is exposed outside even when the sliding door 30 is located in the full-closing position, in the full-opening position and in the position between the full-opening position and full-closing position.

Figure 8:
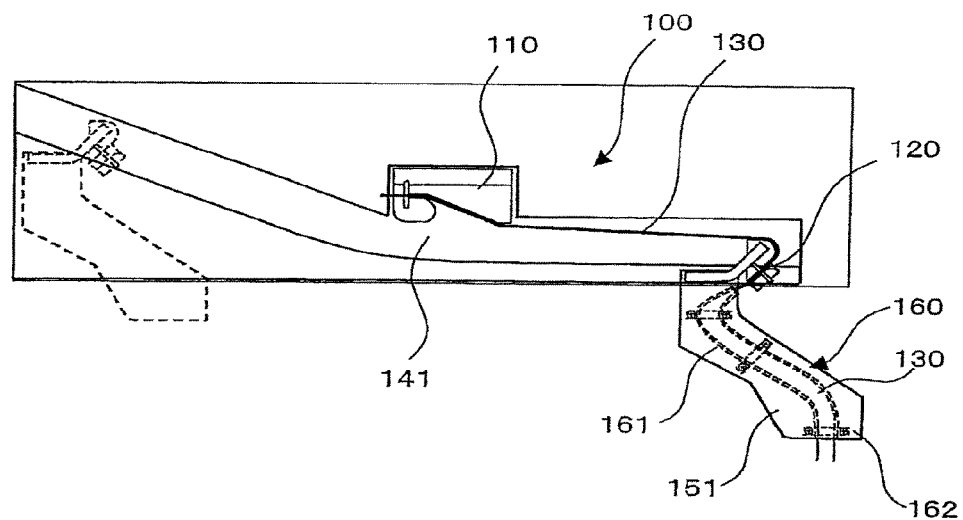
FIG. 8 is plan view of the power supply apparatus for sliding door according to the third embodiment of the present invention.

The plan view of the power supply apparatus for sliding door according to the third embodiment of the present invention is shown in FIG. 8. The power supply apparatus for sliding door 100 of the present embodiment is provided in the vicinity of the guide rail 141 provided in the vehicle body for opening and closing the sliding door. One embodiment of the vehicle configuration in the vicinity of the sliding door is as explained with reference to FIG. 2.

The power supply apparatus for sliding door 100 of the present invention includes, a vehicle body side fixing member 110 provided in the guide rail receive member 143, a bracket side fixing member 120 provided in the bracket 151, a wiring body 130 for supplying power from the vehicle body 140 side to the sliding door 150 side, a running member for bracket 160 for running the wiring body 130 on the back surface of the bracket and holding the wiring body 130.

Figure 9:
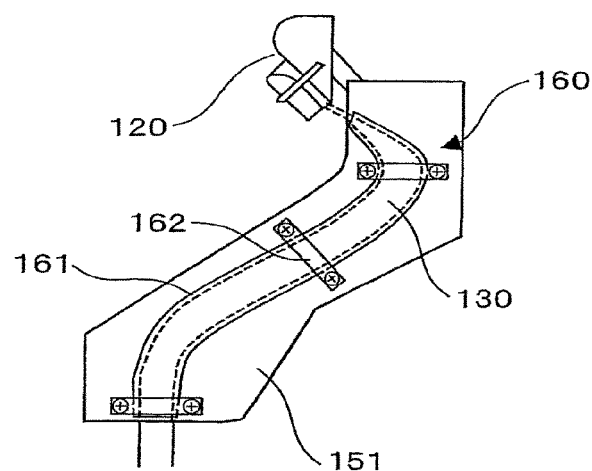
FIG. 9 shows the condition in which the running member for bracket is fixed on the back surface of the bracket according to the third embodiment of the present invention.

The condition in which the running member for bracket 160 is fixed on the back surface of the bracket 151 is shown in FIG. 9. The running member for bracket 160 includes the running tube 161 into which the wiring body is inserted, and the fixing member 162 for fixing the running tube 161 on the back surface of the bracket 151. Not only flat cable but, for example, round wire can be used as the wiring body 130.

In the embodiment shown in FIG. 8 and FIG. 9, since the flat cable, as the wiring body 130, is arranged to run between the vehicle body side fixing member 110 and the bracket side fixing member 120 in such a manner that the flat surface is perpendicularly maintained, the flat cable is perpendicularly extracted from the bracket side fixing member 120 toward the bracket 151. In the present embodiment, a flat cable arranged to perpendicularly run can be horizontally fixed on the back surface of the bracket 151 in use of the running tube 161 whose section is twisted from perpendicular into horizontal and curved such as adjusted to the shape of the bracket 151.

The running tube 161 into which the wiring body 130 is inserted, is fixed on the bracket 151 with the fixing members 162. Preferably, the fixing members 162 are provided, at least, in the position where the section of the running tube 161 is twisted from perpendicular into horizontal and in the other end. In addition, it is preferable to add the fixing members provided with appropriate gaps.

As described above, since the flat surface of the wiring body 130 is twisted such as being parallel to the back surface of the bracket 151 in use of the running tube for bracket 160 including the running tube 161 and the fixing member 162, the wiring body 130 can be preferably arranged to run. Accordingly, it is possible to prevent the wiring body 130 from being exposed from the bracket 151 and to improve the appearance even when the sliding door is opened. Furthermore, for example, the running tube 161 can be extended to and provided in the bracket side fixing member 120, not only on the back surface of the bracket 151. Or it can be extended to and provided in the sliding door 150.

Figure 10:
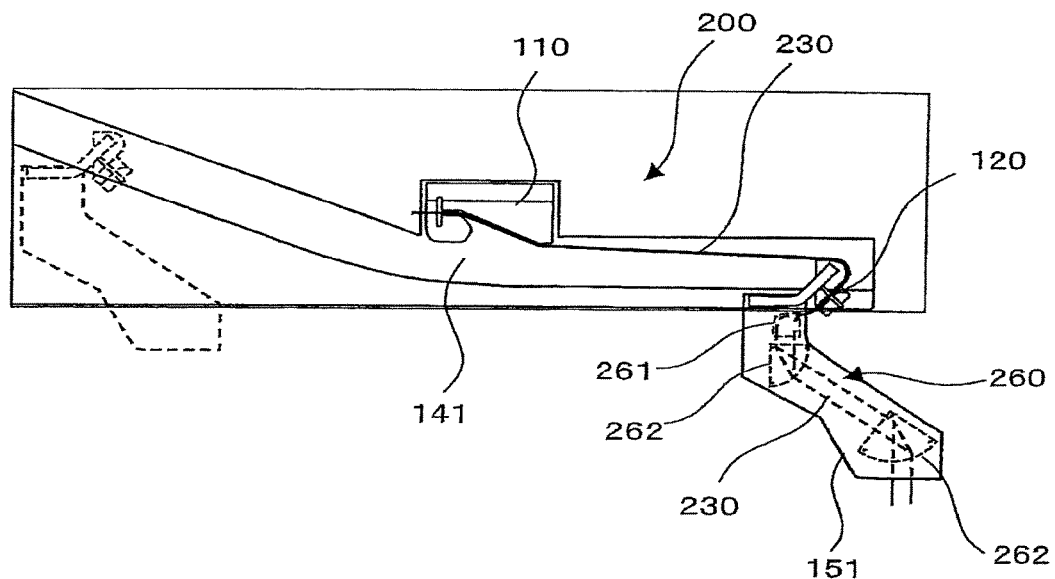
FIG. 10 is plan view of the power supply apparatus for sliding door according to the fourth embodiment of the present invention.
Figure 11:
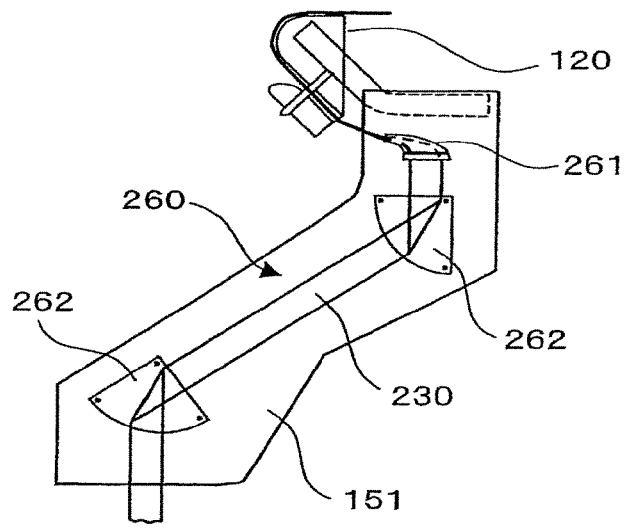
FIG. 11 shows the condition in which a running member for bracket is provided on the back surface of the bracket according to the fourth embodiment of the present invention.

The power supply apparatus for sliding door according to the fourth embodiment of the present invention is explained below in use of the embodiment shown in FIG. 10. In the present embodiment, flat cable 230 is used as the wiring body, and the flat surface adjustment member 261 and the running direction control member 262 are provided as running member for bracket 260 for running the flat cable 230 on the back surface of the bracket 151. The running member for bracket 260 provided on the back surface of the bracket 151 is shown in FIG. 11.

Figure 12:
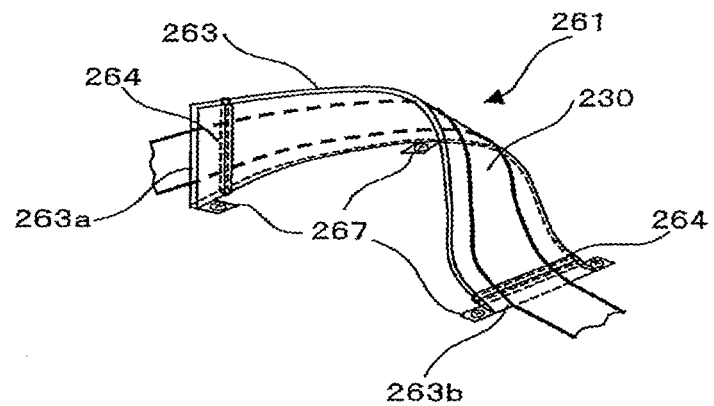
FIG. 12 shows one embodiment of the flat surface adjustment member.
Figure 12:
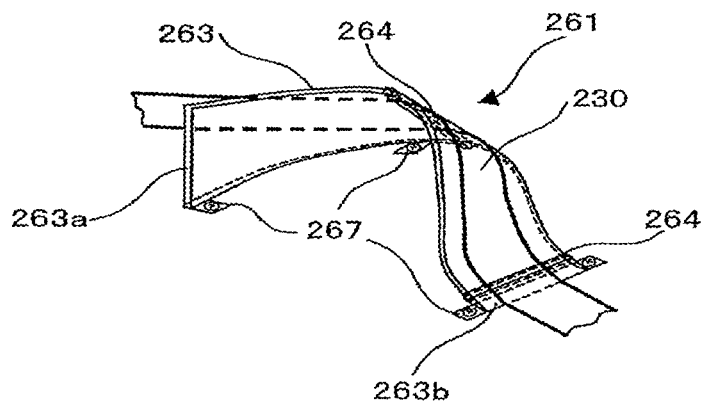

The flat surface adjustment member 261 is provided for adjusting the flat cable 230 arranged to perpendicularly run to the bracket side fixing member 151 such as being horizontal on the back surface of the bracket 151. One example of the flat surface adjustment member 261 is shown in FIG. 12. The flat surface adjustment member 261 consists of running base member 263 and wiring fixing member 264 in which the flat cable 230 is arranged run on the running base member 263, and is fixed with the wiring fixing member 264.

The running base member 263 has a surface which is perpendicular at the end portion 263*a*, gradually coming into horizontal and horizontal at the end portion 263*b*. In FIG. 12(*a*), since the flat cable 230 arranged to run with the flat surface perpendicular, is arranged to run from the end portion 263*a* to the end portion 263*b* along the running base 263, it is possible to maintain the flat cable 230 horizontal at the end portion 263*b*. The running base 263 can be fixed with, for example, screws 267 on the bracket 151.

In the present embodiment, the flat cable 230 is perpendicularly extracted from the bracket side fixing member 120, however, it is not limited to the case that the flat surface of the flat cable 230 is perpendicularly extracted, but in the case that the flat cable 230 is arranged to run non-parallel to the back surface of the bracket 151, the flat surface adjustment member 261 can also be used. In the case that the flat surface of the flat cable 230 is not perpendicularly maintained, it is possible to horizontally maintain the flat cable 230 at the end portion 263*b* by running the flat cable 230 from the middle of the running base 263.

As described above, since the flat cable 230 extracted from the bracket side fixing member 120 is arranged to horizontally run on the back surface of the bracket 151 in use of the flat surface adjustment member 261, it is possible to securely fix the flat cable 230. It is preferable that the flat surface adjustment member 261 is provided as possible as near the bracket side fixing member 120 on the back surface of the bracket 151. Furthermore, the flat surface adjustment member 261 can be integrally formed with the bracket side fixing member 120.

The flat cable 230 arranged to horizontally run on the back surface of the bracket 151 in use of the flat surface adjustment member 261 is replicated with the running direction control member 262 and is arranged to run to the sliding door side end portion of the bracket 151. The running direction control member 262 is used for controlling the running direction of the flat cable 230 from the flat surface adjustment member 261 to the sliding door side end portion of the bracket 151 in order to prevent the flat cable 230 from going beyond the bracket 151.

Figure 13:
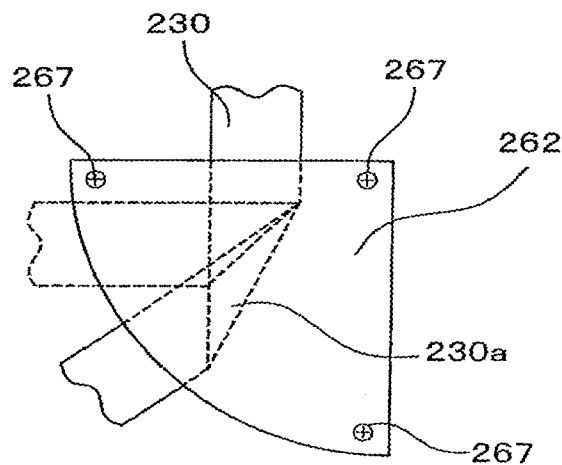
FIG. 13 shows one embodiment of the running direction control member.

One embodiment of the running direction control member 262 is shown in FIG. 13. The running direction control member 262 is used for nipping and fixing the replicated portion 230*a* of the flat cable 230. The flat cable 230 is replicated at replicated portion 230*a* in the prescribed direction, and is arranged to run in the prescribed direction after the replicated portion 230*a* is pressed and fixed with the running direction control member 262. The running direction control member 262 can be fixed on the bracket 151, for example, with screws 267.

As described above, it is possible to securely fix the replicated portion 230*a* of the flat cable 230 on the bracket 151 in use of the running direction control member 262. The flat cable 230 is replicated to the left in the embodiment shown in FIG. 13, however, the running direction control member 262 having the wire fixture 266 on the right side can be used when the flat cable 230 is replicated to the right. Otherwise, the running direction control member 262 having the wire fixture 266 on both sides, left and right, can be used.

Figure 14:
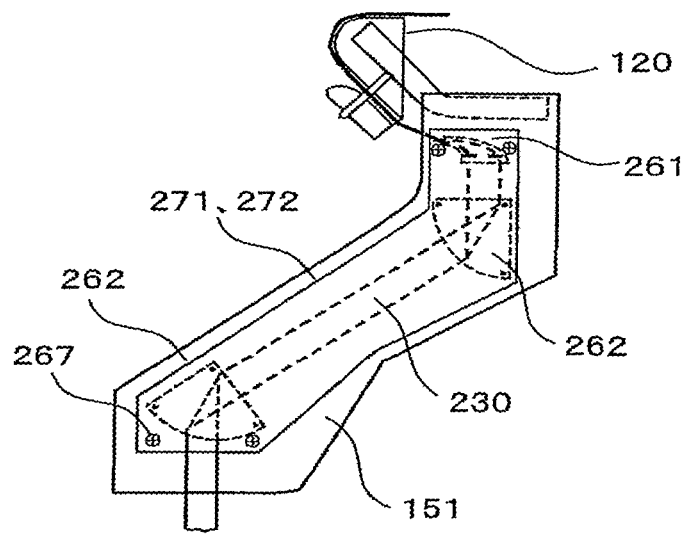
FIG. 14 shows the running member for bracket according to the fifth embodiment of the present invention.

The power supply apparatus for sliding door according to the fifth embodiment of the present invention is explained in use of the embodiment shown in FIG. 14. In the present embodiment, further, the running base 271 and the protection cover 272 are added to the running member for bracket 260 of the second embodiment described above. FIG. 14 is plan view of the running member for bracket 270 fixed on the bracket 151.

In FIG. 14, the flat surface adjustment member 261 and the running direction control member 262 are provided in the running base 271 and the running base 271 is fixed on the bracket 151. As described above, by fixing the flat surface adjustment member 261 and the running direction control member 262 in use of the running base 271, the number of the fixing points on the bracket 151 can be reduced, and only 4 screws 267 are used for fixing the flat surface adjustment member 261 and running direction control member 262 on the bracket 151 in FIG. 14. Accordingly, it is possible to reduce the number of screw holes on the bracket 151 into which the screws 267 are inserted and to reduce the stress on the bracket 151.

Furthermore, the flat cable can be easily and securely engaged and provided on the running base 271. In the present embodiment, the flat cable 230, flat surface adjustment member 261 and running direction control member 262 are covered with the protection cover 230 and fixed with the screws 267. Therefore, it is possible to safely protect the flat cable without damages from the outside. In use of the running member for bracket 270 of the present embodiment, since the flat cable is not exposed when looking from the interior, and even when looking into a lower position of the vehicle body, it is possible to provide the power supply apparatus for sliding door which presents a good appearance.

Furthermore, either a rectangular conductor or a round wire, as the wiring body, can be used for a conductor enclosed within the flat cable however, it is preferable to use the flat cable in which the rectangular conductor is enclosed.

Figure 15:
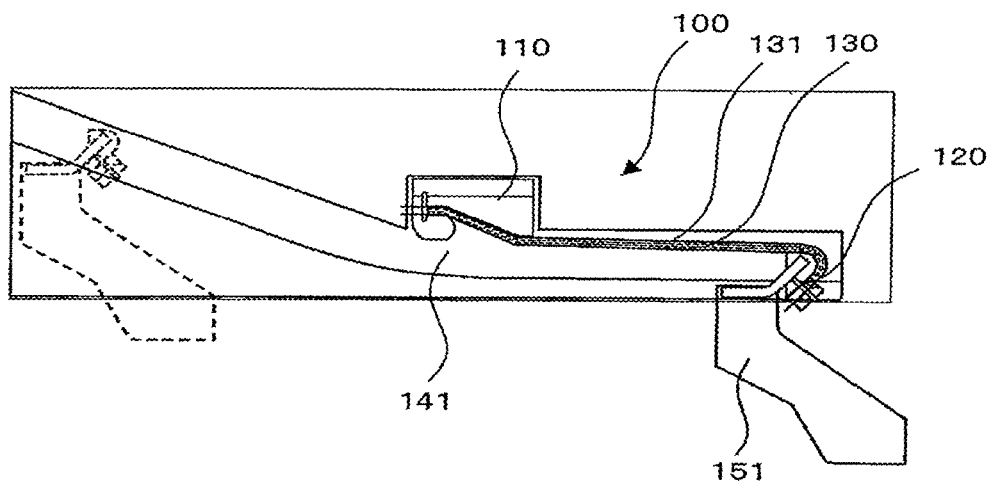
FIG. 15 is plan view of the power supply apparatus for sliding door according to the sixth embodiment of the present invention.

The plan view of the power supply apparatus for sliding door according to the sixth embodiment of the present invention is shown in FIG. 15. The power supply apparatus for sliding door 100 of the present invention is provided in the vicinity of the guide rail 141 provided in the vehicle body for opening and closing of the sliding door. One example of the vehicle configuration in the vicinity of the sliding door is as explained in use of FIG. 2.

The power supply apparatus for sliding door 100 of the present embodiment includes, a bracket side fixing member 120 provided in the bracket 151, a wiring body for supplying power from a vehicle body side to the sliding door 150 side, an exterior tube 131 into which the wiring body 130 is inserted for protecting the wiring body 130. The wiring body is held directly, or under the exterior tube 131, by the vehicle body side fixing member 110 and bracket side fixing member 120. In the present embodiment, the exterior tube 131 has characteristics in its configuration.

The vehicle body side fixing member 110 is provided more inside the vehicle body 140 than the location of the guide rail 141. This is for preventing the vehicle body side fixing member 110 from interfering with the bracket 151 which moves along the guide rail 141. And the vehicle body side fixing member 110 is located substantially in the middle of the guide rail 141 in the direction of the opening and closing of the sliding door 150. Since they are arranged as described above, the wiring body 130 and exterior tube 131 do not have loosening when the sliding door 150 is fully opened and fully closed, and have loosening when the sliding door is in the status between the full-opening and full-closing.

Figure 16:
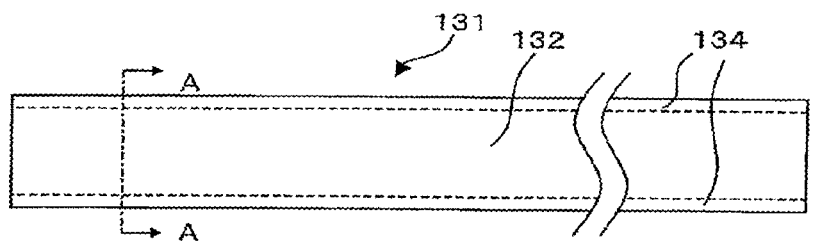
FIG. 16 shows the configuration of the exterior tube according to the sixth embodiment.
Figure 16:
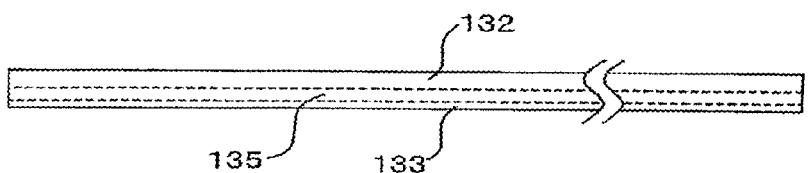
Figure 16:
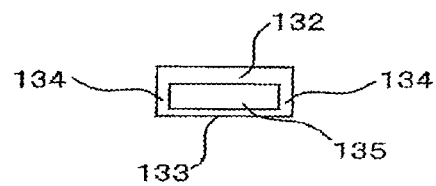
Figure 17:
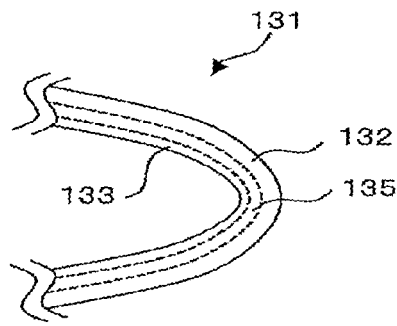
FIG. 17 shows the bending status of the exterior tube.

In the power supply apparatus for sliding door 100 of the present embodiment, the exterior tube 131 has a configuration such as shown in FIG. 16 in order to prevent the wiring body 130 and exterior tube 131 from going beyond the guide rail receiving portion 143 when the wiring body 130 and exterior tube 131 have loosening. FIG. 16 shows (a) plan view, (b) side view and (c) sectional view taken along line A-A of the exterior tube 131. The exterior tube 131 has a hollow portion 135 which is circumscribed with an upper surface 132, a lower surface 133 and two side surfaces 134 to be formed in the longitudinal direction, into which the wiring body 130 is inserted. Such synthetic resin as polypropylene or the like can be used for the material of the exterior tube 131. The exterior tube of other embodiments described above can be made of same material.

In the exterior tube 131 of the present embodiment, the thickness of the upper surface 132 is higher than the thickness of the lower surface 133 as shown in FIG. 16 (c), and, by making the thickness of the upper surface 133 higher, it is possible to maintain the rigidity of the upper surface 132 higher than the rigidity of the lower surface 133. The upper surface 132 having high rigidity can not easily bend, and even when it bends, it tends to bend forming into an arc having high curvature and bend. On the other hand, the lower surface 133 having low rigidity can easily bend, and it tends to bend forming into an arc having lower curvature than the arc into which the upper surface forms. As a result, the exterior tube 131 tends to bend with the lower surface 133 having low rigidity (low curvature) inside and with the upper surface 132 (high curvature) outside.

Figure 20:
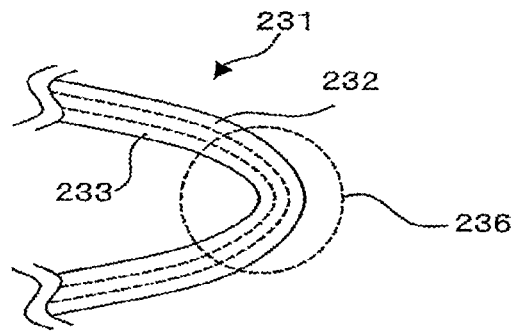
FIG. 20 shows the bent portion of the exterior tube according to the seventh embodiment.

In use of the exterior tube 131 having such a configuration as described above, the power supply apparatus for sliding door 100 of the present embodiment leaves such a trace as shown in FIG. 20 accompanied with the opening and closing of the sliding door150. This figure shows the condition of the exterior tube 131 in the status between the full-opening and full-closing of the sliding door150, and the exterior tube 131 moves inside the guide rail receiving portion 23 having the bent portion 136 whose upper surface 132 is outside and lower 133 surface is inside.

Figure 18:
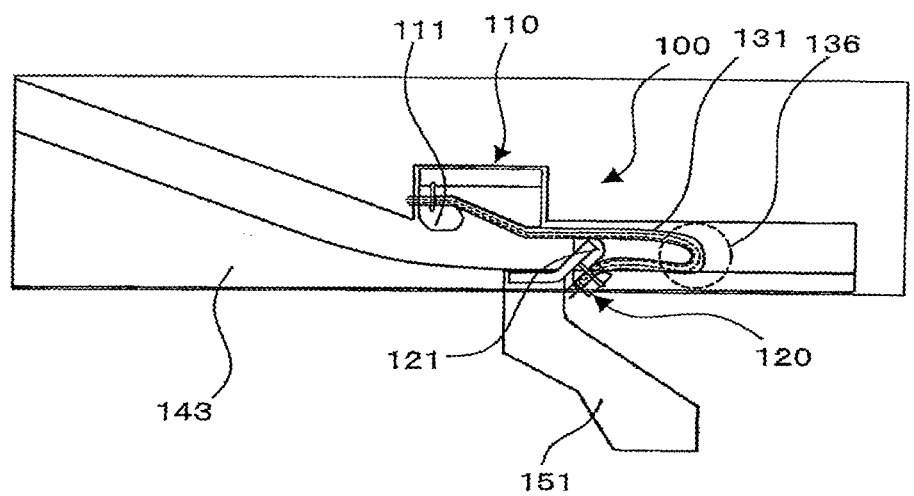
FIG. 18 shows the moving trace of the exterior tube according to the sixth embodiment.

Furthermore, since the vehicle body side fixing member 110 has the configuration in which the first R part 111 is provided, and the bracket side fixing member 120 has the configuration in which the second R part 121 is provided as shown in FIG. 15 and FIG. 18, a bent portion can be formed in the same direction as the bent portion 136 shown in FIG. 18 when the sliding door 150 is fully opened and fully closed, and the exterior tube 131 can be securely moved in the opening and closing of the sliding door 150. As a result, the exterior tube 131 and the wiring body 130 received within the exterior tube 131 are movable inside the guide rail receiving portion 143 without, for example, forming into large arc shape and being exposed outside the guide rail receiving portion 143.

It is preferable to use the flat cable for the wiring body 130 received within the exterior tube 131. In the case that the wiring body 130 in which multiple flat cables are overlapped, is used, since the flat cable has restoring force to be linear when the flat cable is bent in the bent portion 14, the wiring body 13 can be moved only inside the guide rail receive member 23 without a risk that the wiring body 13 forms into a large arc shape and is exposed outside the guide rail receive member 23. Either a rectangular conductor or a round wire can be used for a conductor enclosed within the flat cable as the wiring body 130, however, it is preferable to use the flat cable in which the rectangular conductor is enclosed.

Figure 19:
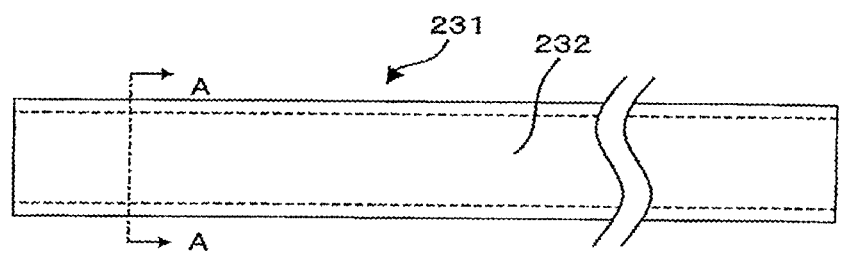
FIG. 19 shows the configuration of the exterior tube according to the seventh embodiment.
Figure 19:
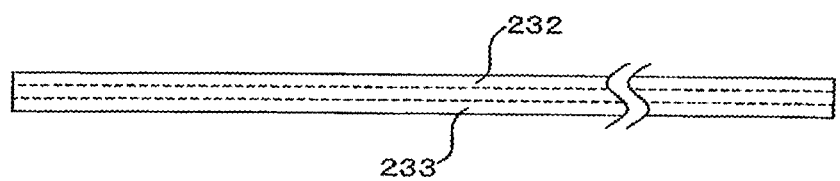
Figure 19:
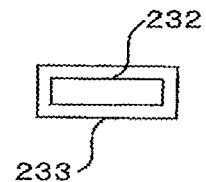

The power supply apparatus for sliding door according to the seventh embodiment of the present invention is explained in use of the embodiment shown in FIG. 19. FIG. 19 shows the configuration of the exterior tube 231 used in the power supply apparatus for sliding door of the present embodiment, and respectively, (a) is plan view of the exterior tube 231, (b) is side view of the exterior tube 231 and (c) is sectional view of the exterior tube 231 taken along line A-A.

In the exterior tube 231 of the present embodiment, the upper surface 232 and the lower surface 233 have equal thickness, however, the upper surface 232 is made of the materials which has high flexibility. Therefore, this enables the exterior tube 231 to easily bend with the upper surface 232 having high flexibility outside. One embodiment of the exterior tube 231 which is in the status of bending is shown in FIG. 20. As this figure shows, the bent portion 236 is formed in the exterior tube 231 with the lower surface 233 inside and with the upper surface 232 stretched.

In the present embodiment, in use of the exterior tube 231, it can securely move inside the guide rail receiving portion only having the bent portion 236 shown in FIG. 20 in the opening and closing of the sliding door. And, by making the thickness of the lower surface 233 low, the curvature of the bent portion 236 can be low, same as the exterior tube 131 of the first embodiment.

Figure 21:
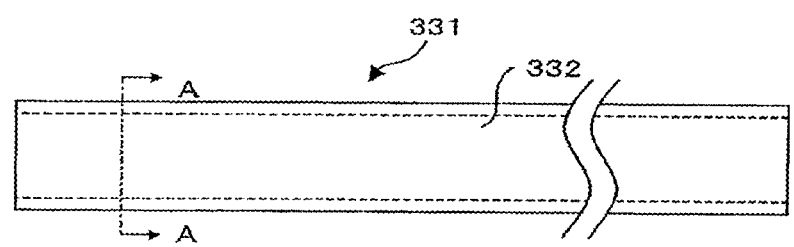
FIG. 21 shows the configuration of the exterior according to the eighth embodiment.
Figure 21:
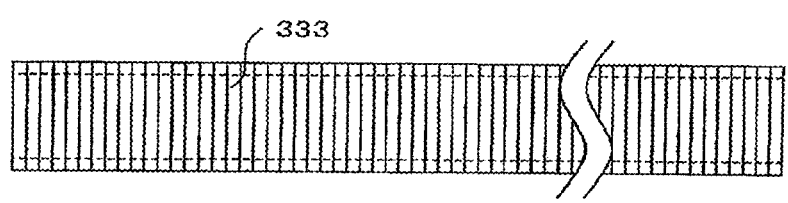
Figure 21:
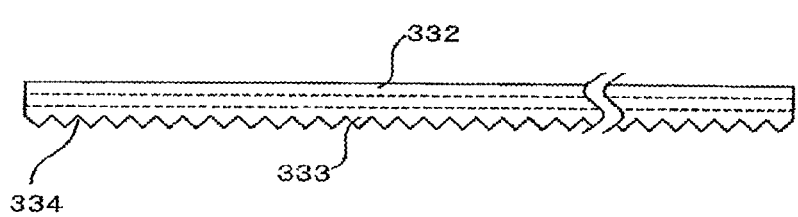
Figure 21:
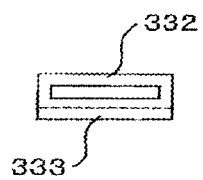

The power supply apparatus for sliding door according to the eighth embodiment of the present invention is explained in use of the embodiment shown in FIG. 21. FIG. 21 shows the configuration of the exterior tube 231 used in the power supply apparatus for sliding door of the present embodiment, and respectively, (a) is plan view of upper surface 332 of the exterior tube 331, (b) is plan view of lower surface 333, (c) is side view and (d) is sectional view taken along line A-A.

Figure 22:
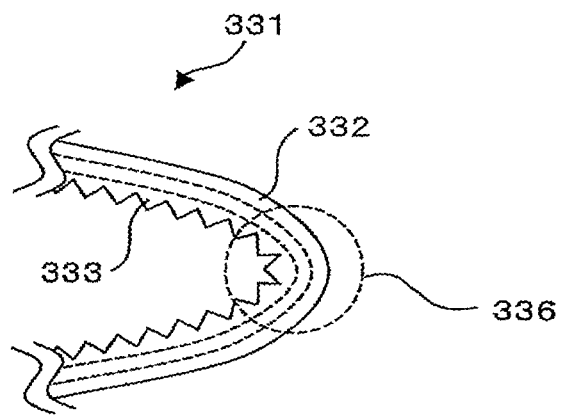
FIG. 22 shows the bent portion of the exterior tube according to the eighth embodiment.

The exterior tube 331 of the present embodiment has a configuration in which numerous triangular grooves 334 are formed on the lower surface 333 and the side view of FIG. 21 (c) wholly presents a saw-like appearance. The numerous triangular grooves 334 formed on the lower surface 333 enables the exterior tube 331 to easily bend with the lower surface 333 inside. One embodiment of the exterior tube 331 in the status of bending is shown in FIG. 22. In the exterior tube 331 formed as described above, the lower surface 333 tends to bend inside with the grooves 334 constricted and the bent portion 336 shown in FIG. 22 is formed.

In the present embodiment, likewise, in use of the exterior tube 331, it can securely move inside the guide rail receiving portion only with the bent portion 236 shown in FIG. 20 formed in the opening and closing of the sliding door.

Figure 23:
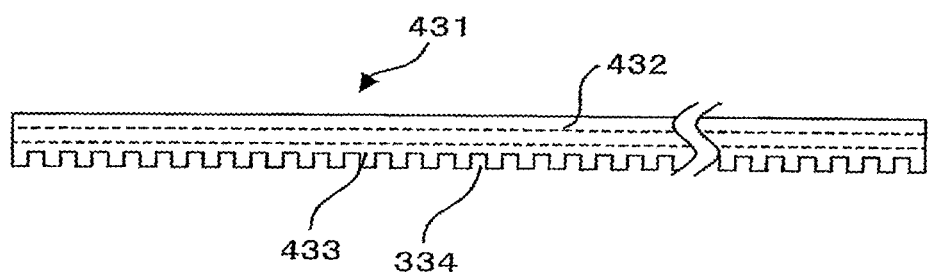
FIG. 23 shows the configuration of the exterior tube according to the ninth embodiment.

The power supply apparatus for sliding door according to the ninth embodiment of the present invention is explained in use of the example shown in FIG. 23. FIG. 23 is side view of the exterior tube 431 used in the power supply apparatus for sliding door of the present embodiment. Although the rectangular grooves 336 are formed on the lower surface 333 of the exterior tube 331 of the embodiment 3-3, rectangular grooves 434 are formed in the exterior tube 431 of the present embodiment.

Figure 24:
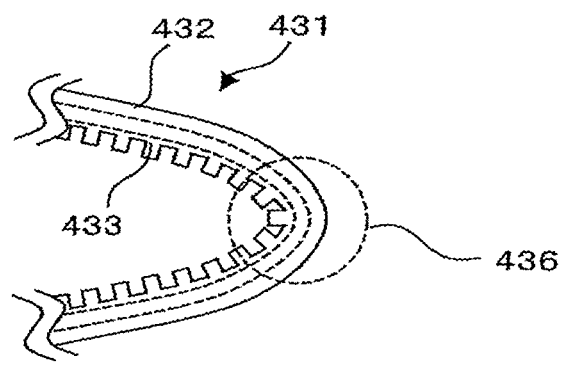
FIG. 24 shows the bent portion of the exterior tube according to the ninth embodiment.

When numerous rectangular grooves 434 are formed on the lower surface 433, the exterior tube 431 can easily bend with the lower surface 433 inside, same as the third embodiment. One example of the exterior tube 431 in the status of bending is shown in FIG. 24. In the exterior tube 431 formed as described above, the lower surface 433 tends to bend inside with the grooves 434 constricted and the bent portion 436 shown in FIG. 24 is formed.

Figure 25:
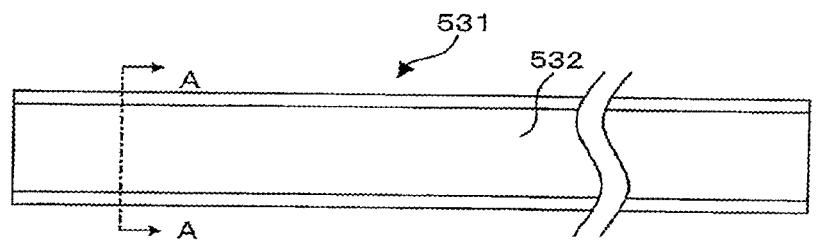
FIG. 25 shows the configuration of the exterior tube according to the tenth embodiment.
Figure 25:
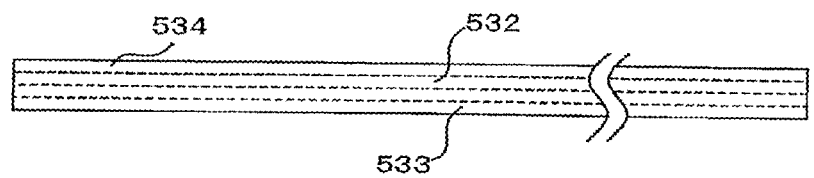
Figure 25:
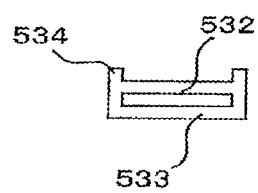

The power supply apparatus for sliding door according to the tenth example of the present invention is explained in use of the example shown in FIG. 25. FIG. 25 shows the configuration of the exterior tube 531 used in the power supply apparatus for sliding door of the present embodiment, and respectively, (a) is plan view of upper surface 532 of the exterior tube 531, (b) is side view of the exterior tube 531 and (c) is sectional view of the exterior tube 531 taken along line A-A.

Figure 26:
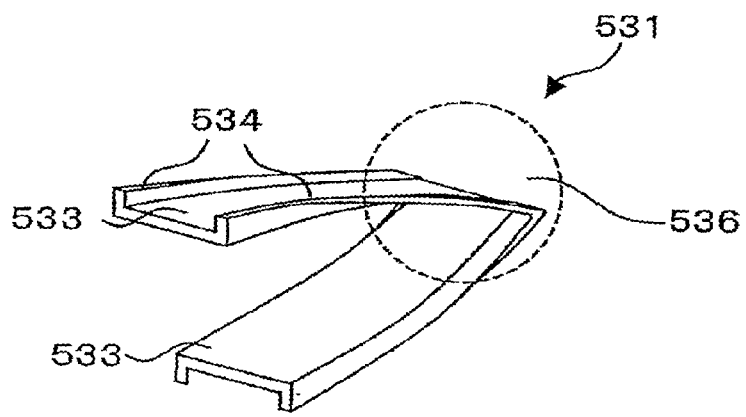
FIG. 26 shows the bent portion of the exterior tube according to the tenth embodiment.

The exterior tube 531 of the present embodiment has a configuration in which protruding portions 534 are formed on the both edges of the upper surface 532. Since these projecting portions 534 are formed on the upper surface 532, the upper surface 532 of the exterior tube 531 tends not to easily bend. As a result, the exterior tube 531 tends to bend with the lower surface 533 inside. As the exterior tube 531 bends, the protruding portions 534 recline outside to be bent. One example of the exterior tube 531 in the status of bending is shown in FIG. 26.

As the exterior tube 531 bends and the protruding portions 534 are bent, the bent portion 536 is sharply bent. Therefore, in the exterior tube 531 of the present embodiment, since the exterior tube 531 sharply bends, it is possible to prevent the exterior tube 531 from expanding to be exposed outside the guide rail receiving portion.

Figure 27:
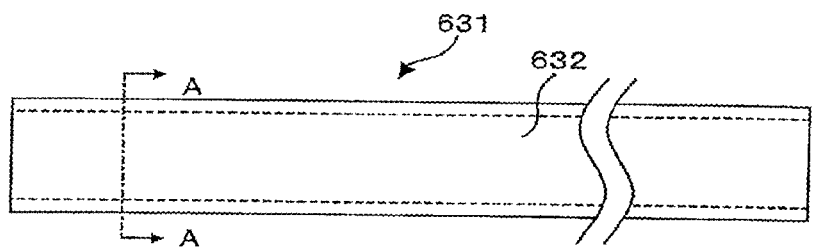
FIG. 27 shows the configuration of the exterior tube according to the eleventh embodiment.
Figure 27:
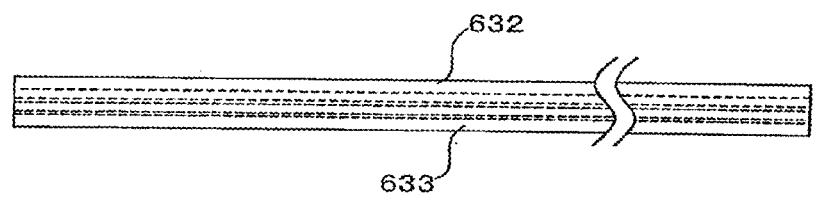
Figure 27:
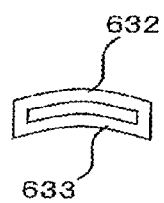

The power supply apparatus for sliding door according to the eleventh embodiment of the present invention is explained in use of the example shown in FIG. 27. FIG. 27 shows the configuration of the exterior tube 631 used in the power supply apparatus for sliding door of the present embodiment, and respectively, (a) is plan view of the exterior tube 631, (b) is side view of the exterior tube 631 and (c) is sectional view of the exterior tube 631 taken along line A-A.

In the exterior tube 631 of the present example, cross sections of the upper surface 632 and the lower surface 633 have an arc shape which upwardly swells as shown in FIG. 27 (c). Since the cross sections have the arc shape shown in FIG. 27 (c), the exterior tube 631 tends not to easily bend with its configuration. Especially, the exterior tube 631 tends not to easily bend with the upper surface 632 swelling in an arc shape inside, and exterior tube 632 bends with the upper surface 632 outside when it bends. One example of the exterior tube 631 in the status of bending is shown in FIG. 28.

Figure 28:
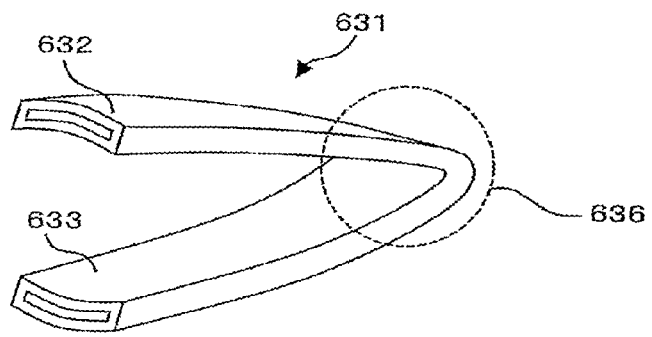
FIG. 28 shows the bent portion of the exterior tube according to the eleventh embodiment.

FIG. 28 shows an example of the bent portion 636 as the exterior tube 631 bends with the upper surface 632 swelling in an arc shape outside. As the exterior tube 631 bends, the bent portion 636 is sharply bent with the arc shape flattened. Namely, in the exterior tube 636 of the present embodiment, same as the exterior tube 531 of the fifth embodiment, the bent portion 636 is sharply bent. Therefore, in the exterior tube 631 of the present embodiment, since the exterior tube 631 sharply bends, it is possible to prevent the exterior tube 631 from expanding to be exposed outside the guide rail receiving portion.

As explained above, in any embodiment of the power supply apparatus for sliding door of the present invention, since the exterior tube has the configuration described above, it is possible to form only one bent portion in the opening and closing of the sliding door, and to securely move the exterior tube and the wiring body received within the exterior tube inside the guide rail receiving portion.

Figure 29:
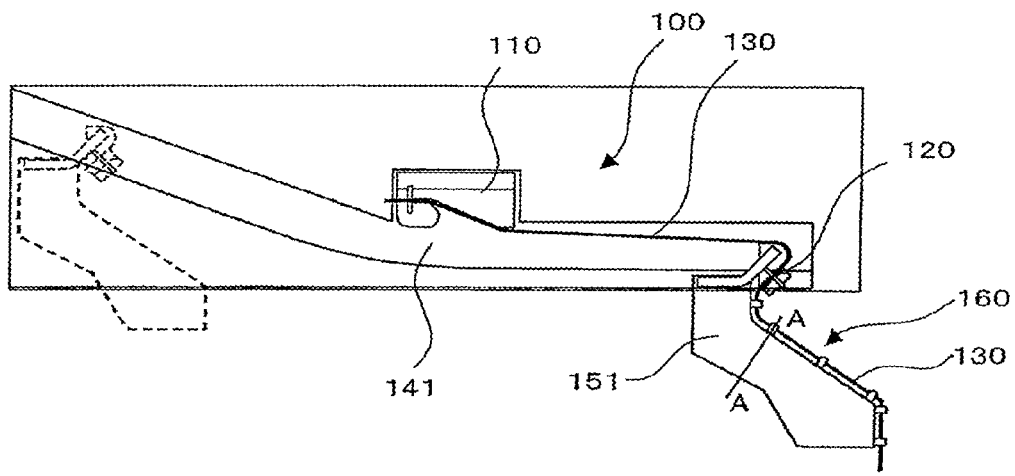
FIG. 29 is plan view of the power supply apparatus for sliding door according to the twelfth embodiment of the invention.
Figure 30:
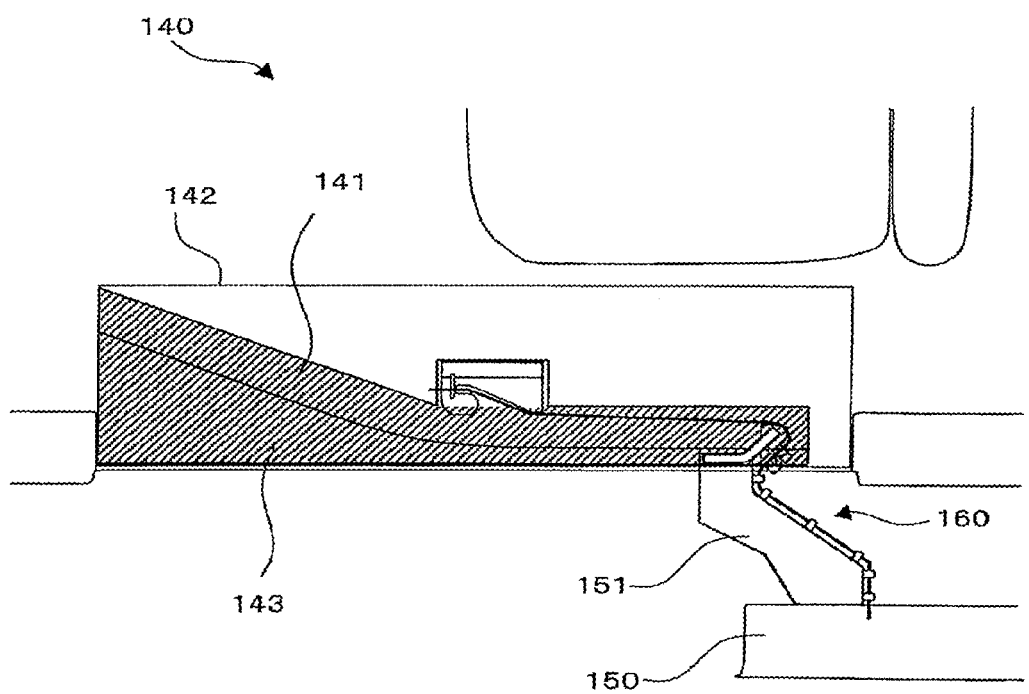
FIG. 30 is plan view of the vehicle configuration in the vicinity of the sliding door.

FIG. 29 is plan view of the power supply apparatus for sliding door of the twelfth embodiment according to the present invention. The power supply apparatus for sliding door 100 of the present embodiment is provided in the vicinity of the guide rail 141 provided in the vehicle body for opening and closing of the sliding door. One embodiment of the vehicle configuration is shown in FIG. 30. In this figure, the sliding door 150 is supported with the bracket 151 provided on the lower front portion of the sliding door 150, another bracket provided on the upper front portion of the sliding door 150 and another bracket provided on the rear portion of the sliding door 150 which are not shown in the figures.

On the vehicle body 140 side, a step 142 is provided in the sliding door entry portion and the guide rail 141 is provided beneath the step 142. The guide rail receiving portion 143 (shown in FIG. 30 as shaded) in which the guide rail 141 is provided, is space for the bracket 151 to travel. The sliding door 150 is arranged to open and close as the roller provided on the vehicle body side end of the bracket 151, which is not shown in the figures, travels along the guide rail 141.

Furthermore, the guide rail receiving portion is also provided for the bracket provided on the upper portion of the sliding door 150, and the power supply apparatus for sliding door according to the present invention is applicable to the upper bracket and guide rail receiving portion. Otherwise, it is applicable to both the upper and lower brackets and guide rail receiving portions.

The guide rail 141 is provided parallel to the vehicle body 140 such that the sliding door 150 moves parallel to the vehicle body 140 from the full-opening status shown in FIG. 30 to the half-closing status. Since, when the sliding door 150 moves to the full-closing status, it is necessary to pull the sliding door 150 toward the vehicle body 140 side, the guide rail 141 is arranged to curve toward the inside of the vehicle body 140 in the vicinity of the middle portion and extended to the front portion.

The power supply apparatus for sliding door 100 of the present embodiment includes the vehicle body side fixing member 110 provided in the guide rail receiving portion 143, the bracket side fixing member 120 provided in the bracket 151 and the wiring support member 160 for running the wiring body extracted from the bracket side fixing member 120 to the sliding door 150 along the edge portion of the bracket 151. The wiring body 130 is held by the vehicle body side fixing member 110 and the bracket side fixing member 120, and further is arranged to run along the edge portion of the bracket 150 with the wiring support member 160 to the sliding door 150.

Figure 31:
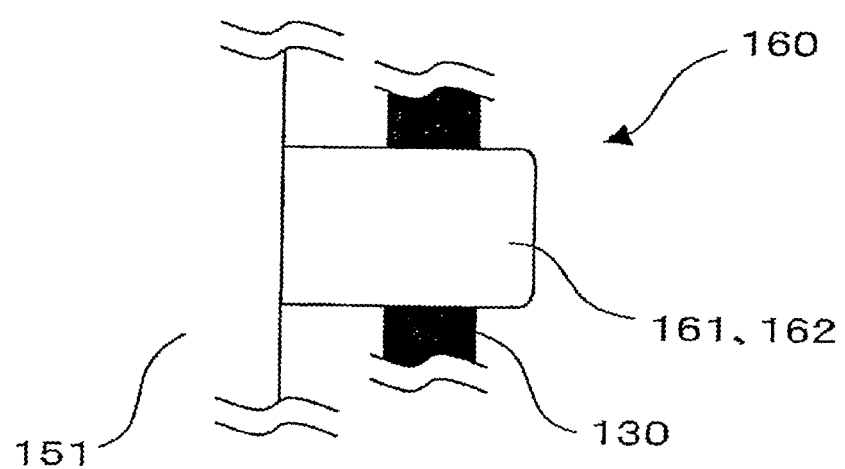
FIG. 31 shows the configuration of the wiring support member according to the twelfth embodiment.
Figure 31:
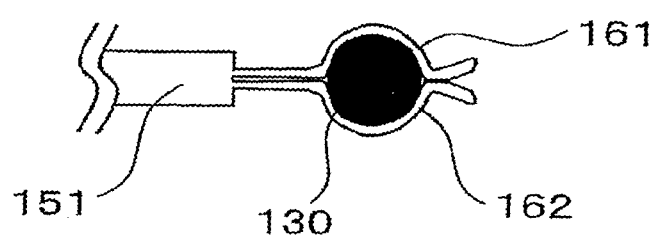

The configuration of the wiring support member 160 according to the present embodiment is shown in FIG. 31. The wiring support member 160 includes, at least, not less than two pairs of two fixing hooks 161, 162 facing each other, and has a configuration in which the wiring body 130 is inserted between the two fixing hooks 161, 162, to be supported. FIG. 31 (a) shows the condition in which the wiring body 130 is inserted between the two fixing hooks 161, 162 to be fixed, and (a) is plan view and (b) is sectional view taken along line A-A of FIG. 1.

FIG. 29 and FIG. 31 show the case in which a round wire is used as the wiring body 130, and sections of the fixing hooks 161, 162 have shapes accompanied with the shape of the wiring body 130 such that the wiring body 130 is easily held. The fixing hooks 161, 162 are impelled to press each other such that the wiring body 130 can be forcibly inserted from the edges of them. In the wiring support member 160 shown in FIG. 29, six pairs of the fixing hooks 161, 162 having the configuration described above are arrayed along the edge portion of the bracket 151. The number of the pair can be appropriately decided according to the configuration, size or the like of the bracket 151.

Figure 32:
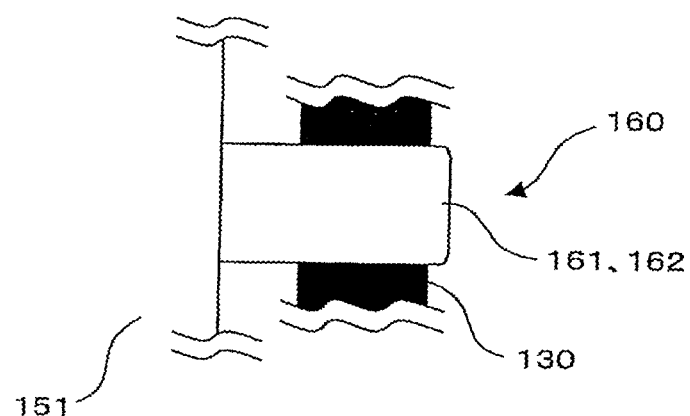
FIG. 32 shows the configuration of the wiring support member in the case the wiring body is the flat cable.
Figure 32:
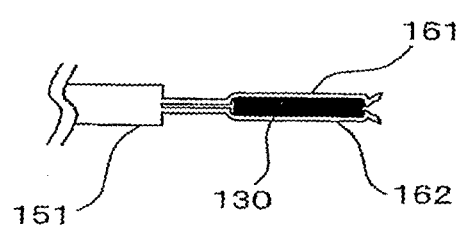

The configuration of the wiring support member 160 in which a flat cable is used as the wiring body 130 is shown, as an example, in (a) as plan view and (b) as sectional view of FIG. 32. In the case that a flat cable is used as the wiring body 130, it is preferable that the fixing hooks 161, 162 have flat shape and have a hollow only in a portion into where the flat cable is inserted. The flat cable is inserted and fitted into the prescribed hollow from the edges of the fixing hooks 161, 162 such that the flat cable is held by the fixing hooks 161, 162.

Furthermore, the fixing hooks 161, 162 can be integrally formed with the bracket 151. And in the embodiment described above, the wiring body 130 is directly held by the fixing hooks 161, 162, however, in the case the wiring body 130 is inserted into a protection tube, the wiring body 130 can be held by the fixing hooks 161, 162 under the protection tube.

Figure 33:
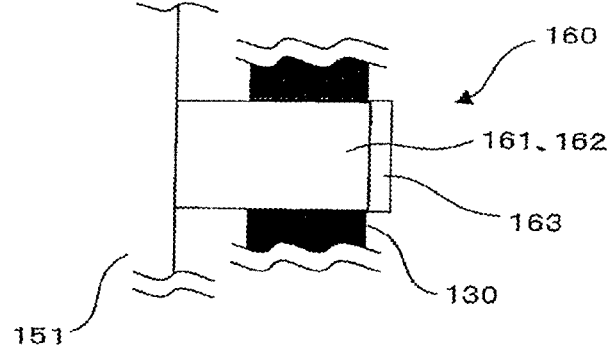
FIG. 33 shows the wiring support member in which the clamp is fitted on the edges of the fixing hooks.
Figure 33:
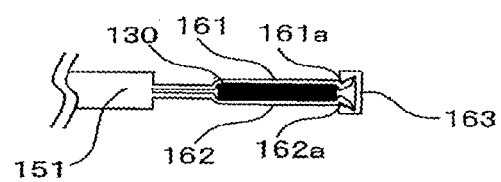

Another embodiment of the wiring support member 160, in which a clamp is fitted on the edges of the fixing hooks 161, 162 for catching them together, is shown in FIG. 33. As shown in FIG. 33 (b), the recesses 161a, 162a are respectively provided on the edges of the fixing hooks 161, 162, and the clamp 163 which is formed such as fitted to the recesses 161a, 161b, is fitted to the recesses 161a, 161b after the flat cable is inserted. Since the edges of the fixing hooks 161,162 are caught together with the clamp 163 as described above, it is possible to avoid a risk that the flat cable is detached from the fixing hooks 161,162 by the vibration in the vehicle driving.

Figure 34:
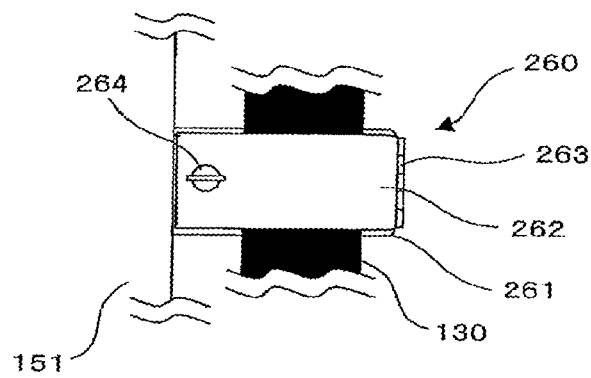
FIG. 34 shows the configuration of the wiring support member according to the thirteenth embodiment.
Figure 34:
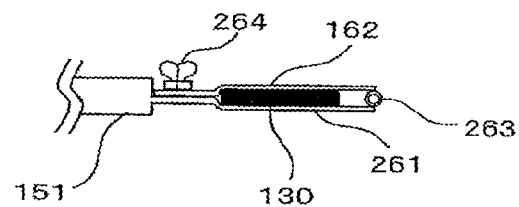

The thirteenth embodiment of the power supply apparatus according to the present invention, in which the wiring support member has another configuration, is explained below in use of FIG. 34. In the wiring support member 260 of the present embodiment, at least, not less than two pairs of a mounting hook 261 formed for mounting the wiring body 130 and a metal fixture 262 facing the mounting hook 261 for interposing and fixing the wiring body 130, are arrayed along the edge portion of the bracket 150, same as the embodiment described above. FIG. 34 (a) is plan view of the wiring support member 260 and FIG. 34 (b) is sectional view of the wiring support member 260.

In the case that the wiring support member 260 of the present embodiment is used, the wiring body 130 is fixed with the metal fixtures 262 after the wiring body 130 is mounted on the mounting hook 261. The metal fixture 262 is connected to the mounting hook 261 with a hinge 263, and is arranged to be rotatable with the hinge 263 used as a central portion. After the wiring body 130 is mounted on the mounting hook 261 and is pinched with the metal fixture 262, the metal fixture 262 can be fixed to the mounting hook 261 with the bolt 264.

In the wiring support member 260 of the present embodiment, since the wiring body 130 is fixed by the mounting hooks 261 and metal fixtures 262, it is possible to prevent the wiring body 130 is from moving between the vehicle body 140 and sliding door 150 in the opening and closing of the sliding door 150, and, therefore, there can be avoided the risk that the wiring body 130 is damaged and the appearance is also improved. Furthermore, since the bolt 264 is connected to the metal fixture 262 such that they can not come apart, the mounting hook 261, metal fixture 262 and bolt 264 are connected and the work efficiency for running the wiring body 130 is improved.

Furthermore, the mounting hook 261 can be integrally formed with the bracket 151. Furthermore, in the embodiment described above, the wiring body 130 is directly held by the mounting hooks 261 and metal fixtures 262, however, the wiring body 130 which is inserted into a protection tube or the like can be held by the mounting hooks 261 and metal fixtures 262 under the protection tube.

Figure 35:
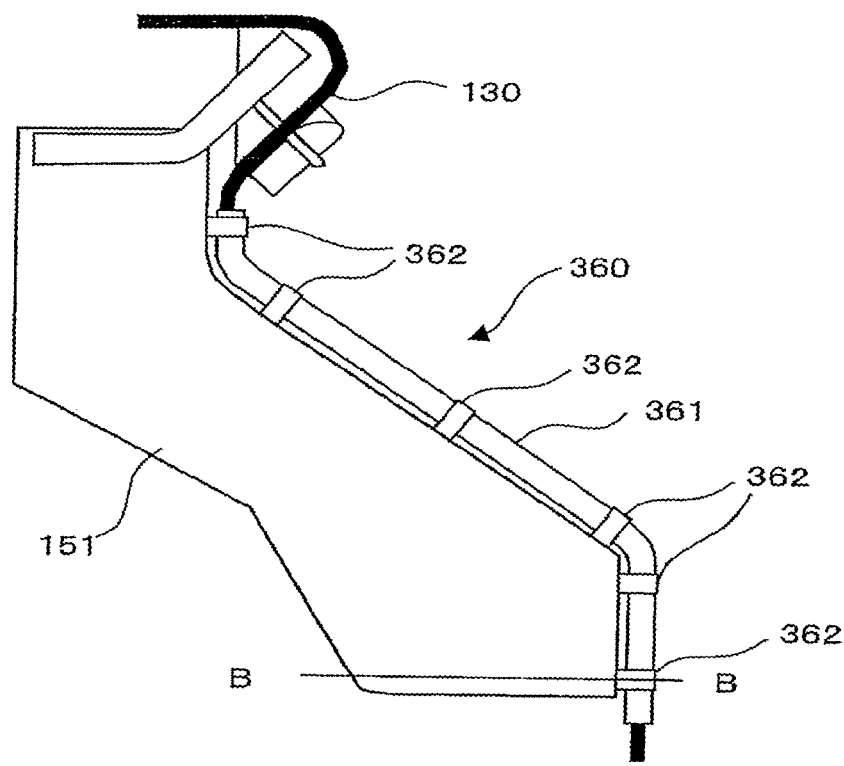
FIG. 35 shows the configuration of the wiring support member according to the fourteenth embodiment.
Figure 35:
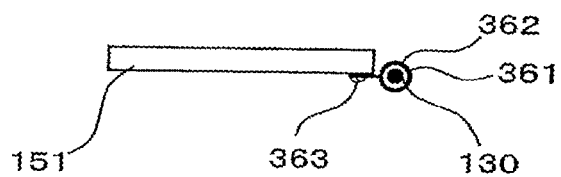

The fourteenth embodiment of the power supply apparatus according to the present invention, in which the wiring support member has another configuration, is explained below in use of FIG. 35. FIG. 35 (*a*) is plan view of the wiring support member 360, and FIG. 35 (*b*) is sectional view taken along line B-B of the wiring support member 360. The wiring support member 360 of the present embodiment includes a running tube 361 and the metal fittings 362 for fixing the running tube 361 on the bracket 151. The running tube 361 is supported with the metal fittings 362 and can be fixed on the bracket 151 with the screws 363.

In use of the wiring support member 360, the wiring body 130 inserted into the running tube 361 from the bracket side fixing member 120, can be arranged to run to the sliding door 150. Since the wiring body 130 is received within the running tube 361, it is possible to prevent the wiring body 130 from moving between the vehicle body 140 and the sliding door 150 in the opening and closing of the sliding door 150, and, therefore, there can be avoided the risk that the wiring body 130 is damaged and the appearance is also improved.

Furthermore, in any embodiment described above, either a round wire or a flat cable can be used as the wiring body 130. Furthermore, either a rectangular conductor or a round wire can be used as a conductor enclosed within the flat cable.

Figure 36:
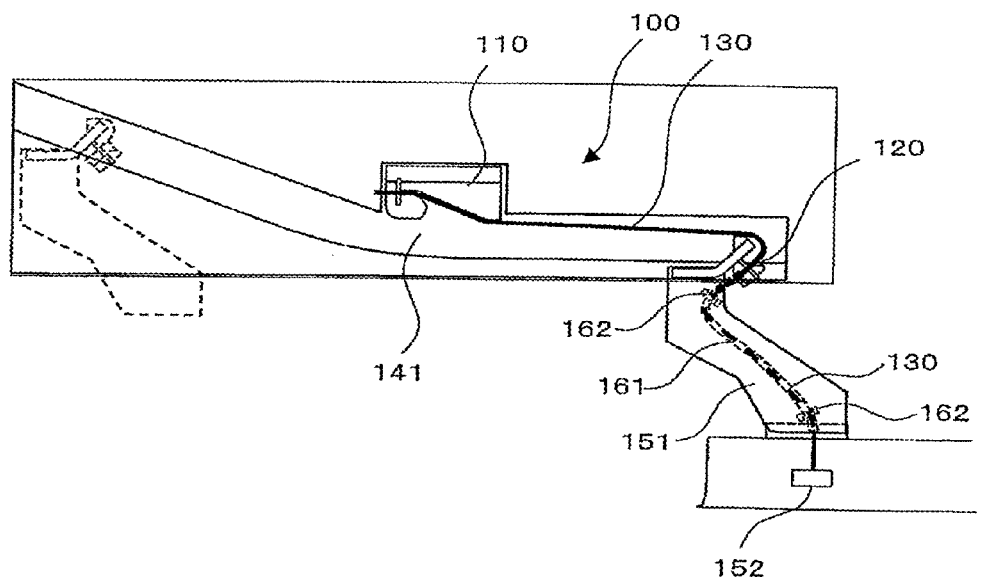
FIG. 36 is plan view of the power supply apparatus for sliding door according to the fifteenth embodiment.
Figure 37:
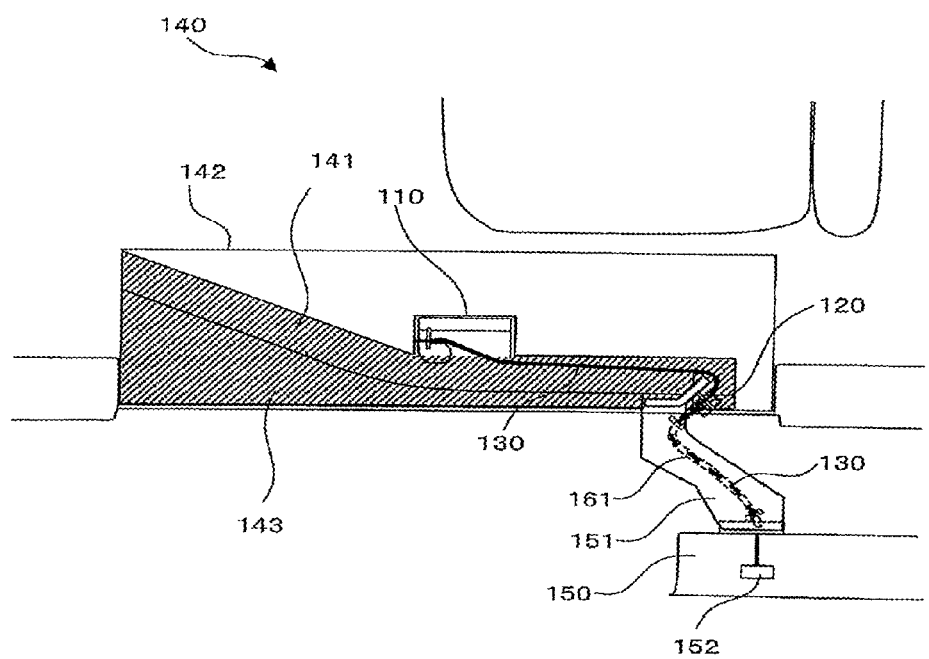
FIG. 37 is plan view of the vehicle configuration in the vicinity of the sliding door.

The plan view of the power supply apparatus for sliding door according to the fifteenth embodiment of the present invention is shown in FIG. 36. The power supply apparatus for sliding door 10 of the present embodiment is provided in the vicinity of the guide rail 141 provided in the vehicle body for opening and closing the sliding door. One example of the vehicle configuration in the vicinity of the sliding door is shown in FIG. 37. In this figure, the sliding door 150 is supported with the bracket 151 provided on the lower front portion of the sliding door 150, and another bracket provided on the upper front portion of the sliding door 150 and another bracket provided on the rear portion of the sliding door 150 which are not shown in the figures.

On the vehicle body side, the step 142 is provided in a sliding door entry portion, and the guide rail 141 is provided underneath the step 142. The guide rail receiving portion 143 (shown in FIG. 37 as shaded) in which the guide rail 141 is provided, is space for the bracket 151 to travel. The sliding door 150 is arranged to open and close as a roller provided on the end of the bracket 151 on the vehicle body side, which is not shown in the figures, travels along the guide rail 141.

Furthermore, the guide rail receiving portion is provided for the bracket provided on the upper portion of the sliding door 150, and the power supply apparatus for sliding door according to the present invention is applicable to the upper bracket and guide rail receiving portion. Otherwise, it is applicable to both the upper and lower bracket and guide rail receiving portion.

The guide rail 141 is provided parallel to the vehicle body 140 such that the sliding door 150 moves parallel to the vehicle body 140 from the full-opening status shown in FIG. 37 to the half-closing status. Since, as the sliding door 150 is moved to the full-closing status, it is necessary to pull the sliding door 150 toward the vehicle body 140 side, the guide rail 141 is arranged to curve toward the inside of the vehicle body 140 in the vicinity of the middle portion to the front portion.

The power supply apparatus for sliding door 100 of the present embodiment includes the vehicle body side fixing member 110 provided in the guide rail receiving portion 143, bracket side fixing member 120 provided on the edge portion of the bracket 31 on the vehicle body 140 side, and the wiring body 130 supported with the vehicle body side fixing member 110 and bracket side fixing member 120 for supplying power from the vehicle body 140 side to the sliding door 150 side. Furthermore, in the power supply apparatus for sliding door 100, the exterior tube 161 into which the wiring body 130 is inserted for protecting the wiring body 130 is provided on the back surface of the bracket 151.

In the present embodiment, the wiring body 130 is arranged to run from vehicle body side fixing member 110 to the back surface of the bracket 151, through the bracket side fixing member 120, and further from the bracket 151 to the sliding door fixing member 152. The wiring body 130 is arranged to run on the back surface of the bracket 151 in order to hide the wiring body 130 in the opening and closing of the sliding door 150 and to improve the appearance.

Figure 38:
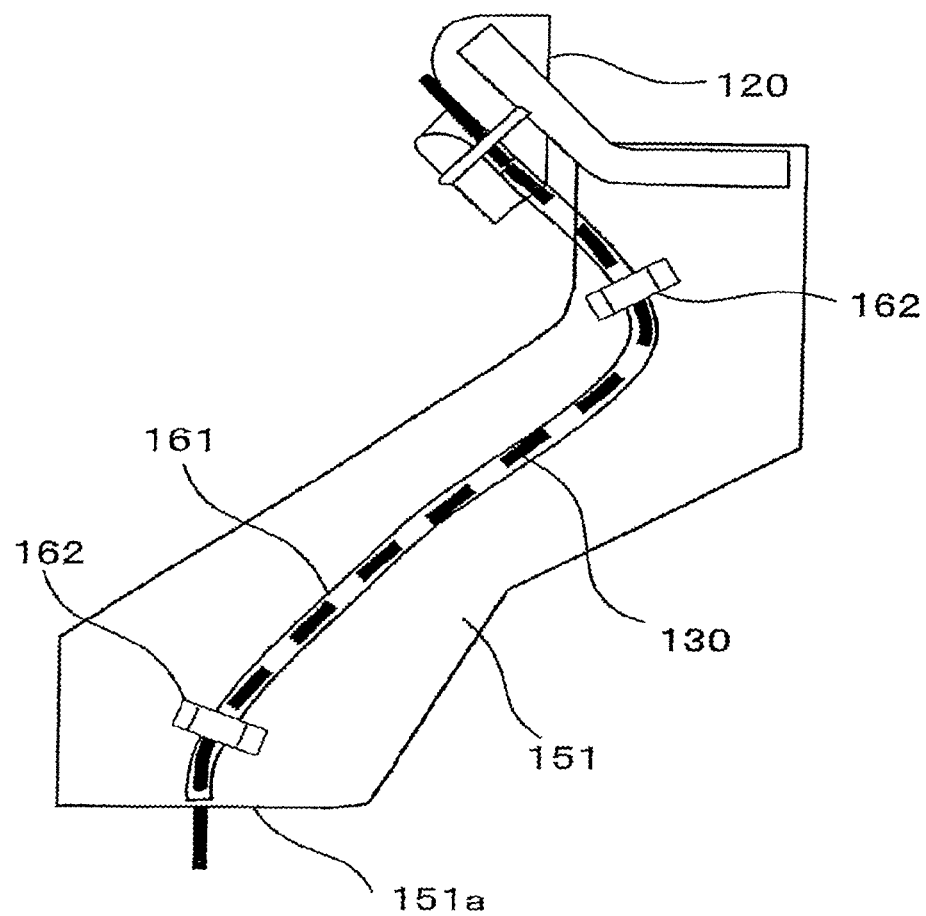
FIG. 38 is plan view of the exterior tube of the fifteenth embodiment provided on the back surface of the bracket.

The details of the exterior tube 161 provided on the back surface of the bracket 151 are shown in FIG. 38. The exterior tube 161 whose one end is held with the bracket side fixing member 120, reaches to the back surface of the bracket 151 from the bracket side fixing member 120 through minimum route. And the exterior tube 161 is arranged to run to the vicinity of the end portion 151*a* of the bracket 151 on the sliding door side, through a route hidden by the front surface of the bracket 151. The exterior tube 161 is appropriately fixed on the bracket 151 with the metal fittings 162.

One end of the exterior tube 161 is held with the bracket side fixing member 120 in order to prevent considerable stress from being applied to the wiring body 130. In the case that the exterior tube 161 were provided, for example, only on the back surface of the bracket 151, the wiring body 130 would be exposed between the bracket side fixing member 120 and entry portion of the exterior tube 161. In this case, there would be a risk that considerable stress is applied on the wiring body 130 in the entry portion of the exterior tube 161 as the exposed portion of the wiring body 130 sways outside the exterior tube 161. Therefore, the exterior tube 161 is extended to the bracket side fixing member 120, and the wiring body 130 is held with the bracket side fixing member 120 and is inserted into the exterior tube 161 such that the wiring body 130 is fixed without the risk that considerable stress is not applied on the wiring body 130.

In the present embodiment, the exterior tube 161 is provided on the back surface of the bracket 151 because the area in which the wiring body 130 has a risk to be mostly damaged from the outside is a crossing area between the vehicle body 140 and the sliding door 150. In the wiring body 130 of the present embodiment, the wiring body 130 of the crossing area is arranged to run on the back surface of the bracket 151. Since the wiring body 130 is arranged to run on the back surface of the bracket, it is possible to prevent the wiring body 130 from swaying and to securely run the wiring body 130.

When the wiring body 130 is arranged to run on the back surface of the bracket 151, it is preferable to make the rigidity of the exterior tube 161 high in order to prevent the wiring body 130 from being damaged from the outside. Since the bracket 151 is exposed outside between the vehicle body 140 and the sliding door 150, it has risks to be hit by stones or to be moistened with water. Therefore, it is preferable that the exterior tube 261 has high rigidity in order to prevent the wiring body 130 from being damaged by such obstacles.

Figure 39:
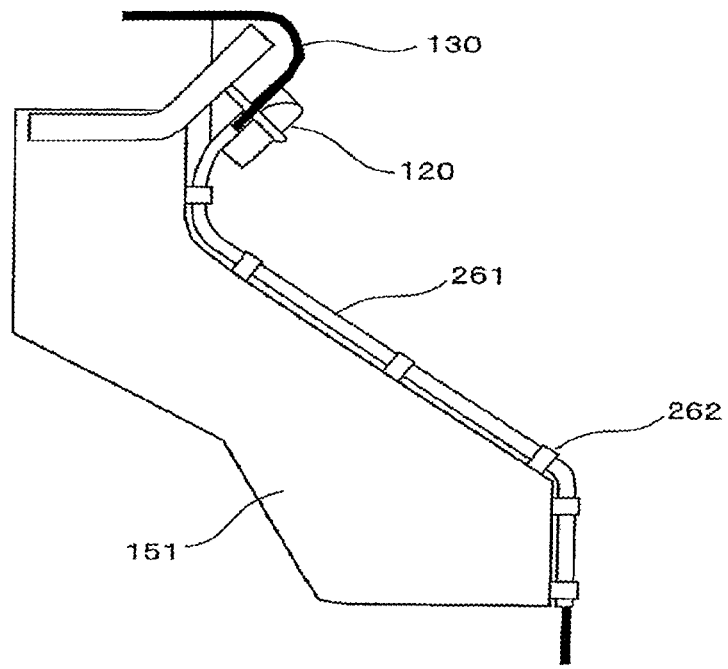
FIG. 39 is plan view of the exterior tube of the sixteenth embodiment.

The power supply apparatus for sliding door of the sixteenth embodiment according to the present invention is explained in use of FIG. 39. In the embodiment shown in FIG. 39, the wiring body 130 is arranged to run along the edge portion of the bracket 151 and the exterior tube 261 is provided along the edge portion of the bracket 151. The exterior tube 261 is pinched and held with the metal fittings 262, and the edges of the metal fittings 262 are fixed with screws or the like on the bracket 151.

In the present embodiment, one end of the exterior tube 261 is also extended to the bracket side fixing member 120, and is held with the bracket side fixing member 120. Accordingly, the wiring body 130 which is held with the bracket side fixing member 120 can be inserted into the exterior tube 161 and, same as the first embodiment, it is possible to prevent considerable stress from being applied on the wiring body 130.

Figure 40:
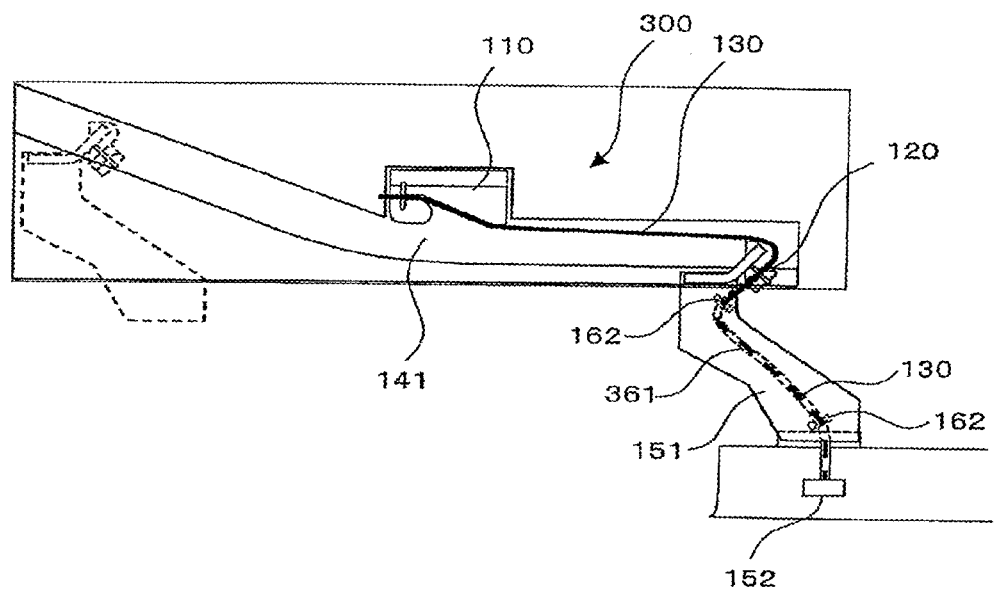
FIG. 40 is plan view of the power supply apparatus for sliding door of the seventeenth embodiment.

The power supply apparatus for sliding door of the seventeenth embodiment according to the present invention is explained in use of FIG. 40. The exterior tube 361 is provided from the bracket side fixing member 120, through the bracket 151, to the sliding door side fixing member 152. Namely, the guide tube 161 of the first embodiment is provided to be extended from the sliding door side end portion 151a of the bracket 151 to the sliding door side fixing member 152.

By extending the exterior tube 361 to the sliding door side fixing member 152, the wiring body 130 can be protected between the bracket side fixing member 120 and the sliding door side fixing member 152 with the exterior tube 361. In the case that the wiring body 130 has a risk to be damaged from the outside in the area between the sliding door side end portion 151a of the bracket 151 and the sliding door side fixing member 152, it is preferable to use the exterior tube 361 of the present embodiment.

Furthermore, it is preferable that the end portion of the exterior tube 361 provided to the sliding door side fixing member 152 is fixed together with the wiring body 103 in the sliding door side fixing member 152. When the wiring body 130 is exposed outside between the end portion of the exterior tube 361 and the sliding door side fixing member 152, there is a risk that considerable stress is applied on the wiring body 130 for the reason same as the reason why the another end portion is fixed in the bracket side fixing member120.

In the present embodiment, the wiring body 130 is protected between the bracket side fixing member 120 and the sliding door side fixing member 152 with the single exterior tube 361, however, it is preferable that the wiring body 130 is fixed not to move in the area. Accordingly, it is preferable that the exterior tube 361 has high rigidity and is integrally formed. Therefore, it is possible to securely protect the wiring body 130 with the exterior tube 361 and to prevent the wiring body 130 from being damaged from the outside.

Figure 41:
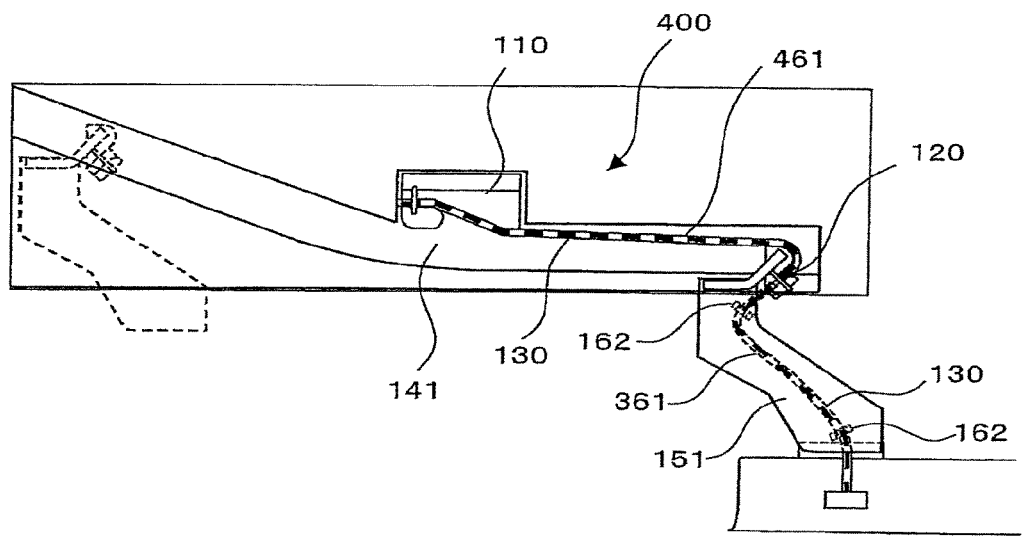
FIG. 41 is plan view of the power supply apparatus for sliding door of the eighteenth embodiment.
Figure 42:
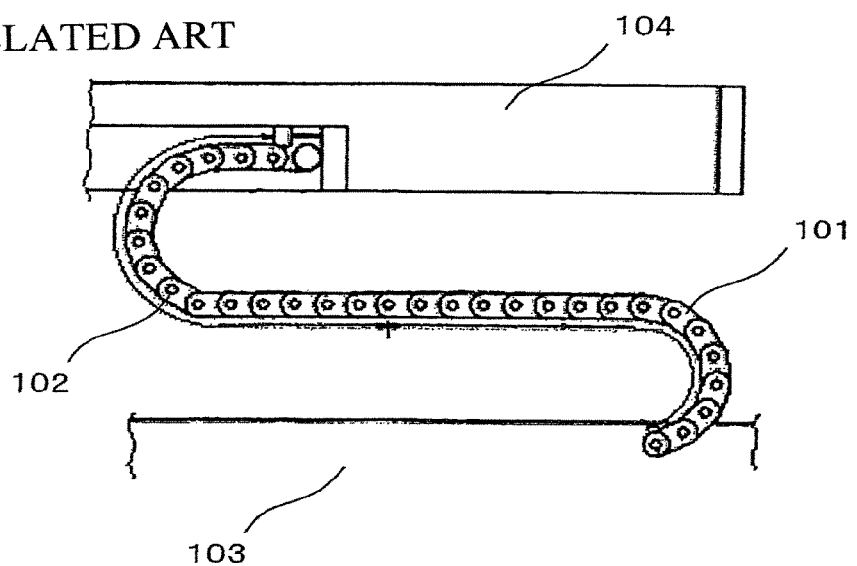
FIG. 42 is plan view of the conventional power supply apparatus for sliding door.

The power supply apparatus for sliding door of the eighteenth embodiment according to the present invention is explained in use of FIG. 41. In the embodiment shown in FIG. 41, another exterior tube 461 is provided in the area from the vehicle body side fixing member 110 to the bracket side fixing member 120, added to the exterior tube 361 provided between the bracket side fixing member 120 and the sliding door side fixing member 152. Namely, the wiring tubes are provided in a whole area from the vehicle body side fixing member 110 and the sliding door side fixing member 152. Accordingly, it is possible to protect the wiring body 130 in a whole area from the vehicle body side fixing member 110 to the sliding door side fixing member 152.

In the present embodiment, the exterior tube 461 provided from the vehicle body side fixing member 110 to the bracket side fixing member 120, which has different rigidity from the exterior tube 361 provided from the bracket side fixing member 120 to the sliding door side fixing member 152, is used. As described above, the wiring body 130 from the bracket side fixing member 120 to the sliding door side fixing member 152 is arranged not to move accompanied with the opening and closing of the sliding door150. Therefore, it is preferable that the exterior tube 361 has high rigidity such that it is not damaged from the outside.

On the other hand, the wiring body 130 provided from the vehicle body side fixing member 110 to the bracket side fixing member 120 is required to move inside the guide rail receiving portion 143 accompanied with the opening and closing of the sliding door 150. Accordingly, when the wiring body 461 has high rigidity same as the exterior tube 361, the wiring body has difficulty to move in side the guide rail receiving portion 143 accompanied with the opening and closing of the sliding door 150. Therefore, the exterior tubes are separately provided as shown with reference numerals 361, 461, and the exterior tube 461 has lower rigidity than the exterior tube 361.

Furthermore, it is preferable to use a flat cable which is movable inside the guide rail receiving portion 143 as the wiring body 130 which is arranged to run from the vehicle body side fixing member 110 to the bracket side fixing member 120. Furthermore, it is preferable to use the flat cable within which a rectangular conductor is enclosed.

In the embodiment described above, the exterior tube 361 of the seventeenth embodiment is used in the combination with the exterior tube 461 of the present embodiment, however, the exterior tube 461 can be used in the combination with the exterior tube 161 of the first embodiment or the exterior tube 261 of the second embodiment. Which exterior tube should be used in the combination with the exterior tube 461 depends on whether it is preferable that the exterior tube is provided between the sliding door side end portion 151a of the bracket 151 and the sliding door side fixing member 152 for protecting the wiring body130.

As described above, in the power supply apparatus for sliding door of the present embodiment, since the area in which the wiring body 130 has a risk to be damaged from the outside is protected with the exterior tube with high rigidity, it is possible to maintain the soundness of the wiring body 130 and to realize high reliability on it. The area in which the wiring body has a risk to be damaged includes, at least, the bracket 151 which is exposed outside in the opening and closing the sliding door.

As an example, the power supply apparatus for sliding door according to the present invention is shown in the description of the present embodiment, but the present invention is not limited thereto. The details of the configuration and operation of the power supply apparatus for sliding door according to the present embodiment can be appropriately changed as far as there is no deviation from the purpose of the present invention.

What is claimed is:

1. A power supply apparatus for a sliding door that supplies power from a vehicle body to said sliding door which is arranged to open and close being moved along a guide rail received in a guide rail receiving portion, the power supply apparatus comprising:

a bracket extending between the sliding door and the vehicle, the bracket including a plate disposed such that a plane through a width of the plate extends horizontally;

a wiring body that supplies power from a vehicle body side of the bracket to a sliding door side of the bracket, said wiring body including a flat cable, and a width of said wiring body being greater than a thickness of said wiring body;

a wiring body fixing member disposed on the vehicle body side of the bracket, said wiring body fixing member holding said wiring body; and a running member for the bracket via which said wiring body is affixed onto a back surface of said bracket such that a plane through the width of the flat cable of the wiring body extends in a substantially parallel position with the plane through the width of the plate along said back surface of said bracket, said running member for the bracket including a running tube into which said wiring body is inserted, a tube fixing member that affixes said running tube onto said back surface of said bracket, and a flat surface adjustment member that adjusts an orientation of said wiring body with respect to the bracket by turning the wiring body extracted from said wiring body fixing member to align the width of the flat cable of the wiring body to the substantially parallel position, the wiring body being positioned within the wiring body fixing member such that the width of the flat cable of the wiring body is substantially perpendicular to said back surface of said bracket.

2. The power supply apparatus for the sliding door as claimed in claim 1, wherein said running member for the bracket further includes a running direction control member that folds said flat cable and controls a running direction of said flat cable.

3. The power supply apparatus for the sliding door as claimed in claim 2, wherein said running member for the bracket further includes a running base plate fixed on said back surface of said bracket.

4. The power supply apparatus for the sliding door as claimed in claim 1, wherein said running member for the bracket further includes a running base plate fixed on said back surface of said bracket.

5. The power supply apparatus for the sliding door as claimed in claim 1, wherein said wiring body fixing member includes a pair of opposing parts between which the wiring body passes.

* * * * *